(12) United States Patent
Lee et al.

(10) Patent No.: US 11,598,931 B2
(45) Date of Patent: Mar. 7, 2023

(54) LENS MOVING APPARATUS

(71) Applicant: LG INNOTEK CO., LTD., Seoul (KR)

(72) Inventors: Jun Taek Lee, Seoul (KR); Byung Wook Son, Seoul (KR); Sang Ok Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 450 days.

(21) Appl. No.: 15/931,120

(22) Filed: May 13, 2020

(65) Prior Publication Data
US 2020/0271891 A1 Aug. 27, 2020

Related U.S. Application Data

(63) Continuation of application No. 15/827,218, filed on Nov. 30, 2017, now Pat. No. 10,663,689, which is a continuation of application No. 14/694,004, filed on Apr. 23, 2015, now Pat. No. 9,857,555.

(30) Foreign Application Priority Data

Apr. 24, 2014  (KR) .......................... 10-2014-0049273
May 9, 2014   (KR) .......................... 10-2014-0055362
Jul. 29, 2014  (KR) .......................... 10-2014-0096577

(51) Int. Cl.
*G02B 7/09*   (2021.01)
*G02B 7/08*   (2021.01)
*G02B 27/64*  (2006.01)
*G03B 3/10*   (2021.01)

(52) U.S. Cl.
CPC .................. *G02B 7/09* (2013.01); *G02B 7/08* (2013.01); *G02B 27/646* (2013.01); *G03B 3/10* (2013.01); *G03B 2205/0069* (2013.01)

(58) Field of Classification Search
CPC .......... G02B 7/08; G02B 7/09; G02B 27/646; G03B 3/10
See application file for complete search history.

(56) References Cited

U.S. PATENT DOCUMENTS

| 8,970,973 B2 | 3/2015 | Cho et al. |
| 2006/0153556 A1 | 7/2006 | Lee et al. |
| 2008/0144201 A1 | 6/2008 | Koc et al. |
| 2012/0120512 A1 | 5/2012 | Wade et al. |

(Continued)

FOREIGN PATENT DOCUMENTS

| CN | 102135656 A | 7/2011 |
| CN | 102955324 A | 3/2013 |
| CN | 103135312 A | 6/2013 |

(Continued)

*Primary Examiner* — Jack Dinh
(74) *Attorney, Agent, or Firm* — Birch, Stewart, Kolasch & Birch, LLP

(57) ABSTRACT

A lens moving apparatus including a housing; a bobbin disposed in the housing; a coil disposed on the bobbin; a magnet disposed on the housing to correspond to the coil; an upper elastic member coupled to an upper portion of the bobbin and an upper portion of the housing; and a damper coupled to the first elastic member and the housing. Further, the upper elastic member comprises a connector connecting the bobbin and the housing and a protrusion extending toward the housing, and the damper is coupled to the protrusion and the housing

19 Claims, 30 Drawing Sheets

(56) References Cited

U.S. PATENT DOCUMENTS

2013/0050828 A1    2/2013   Sato et al.
2013/0142502 A1    6/2013   Kang et al.

FOREIGN PATENT DOCUMENTS

| | | |
|---|---|---|
| CN | 103257427 A | 8/2013 |
| JP | 2012-177753 A | 9/2012 |
| JP | 2013-167867 A | 8/2013 |
| JP | 2013-210550 A | 10/2013 |
| JP | 2014-126668 A | 7/2014 |
| KR | 10-2008-0057117 A | 6/2008 |
| KR | 10-2010-0129930 A | 12/2010 |
| KR | 10-2011-0088402 A | 8/2011 |
| KR | 10-2012-0008967 A | 2/2012 |
| KR | 10-2013-0047268 A | 5/2013 |
| WO | WO 2013/042865 A1 | 3/2013 |

[FIG. 1]
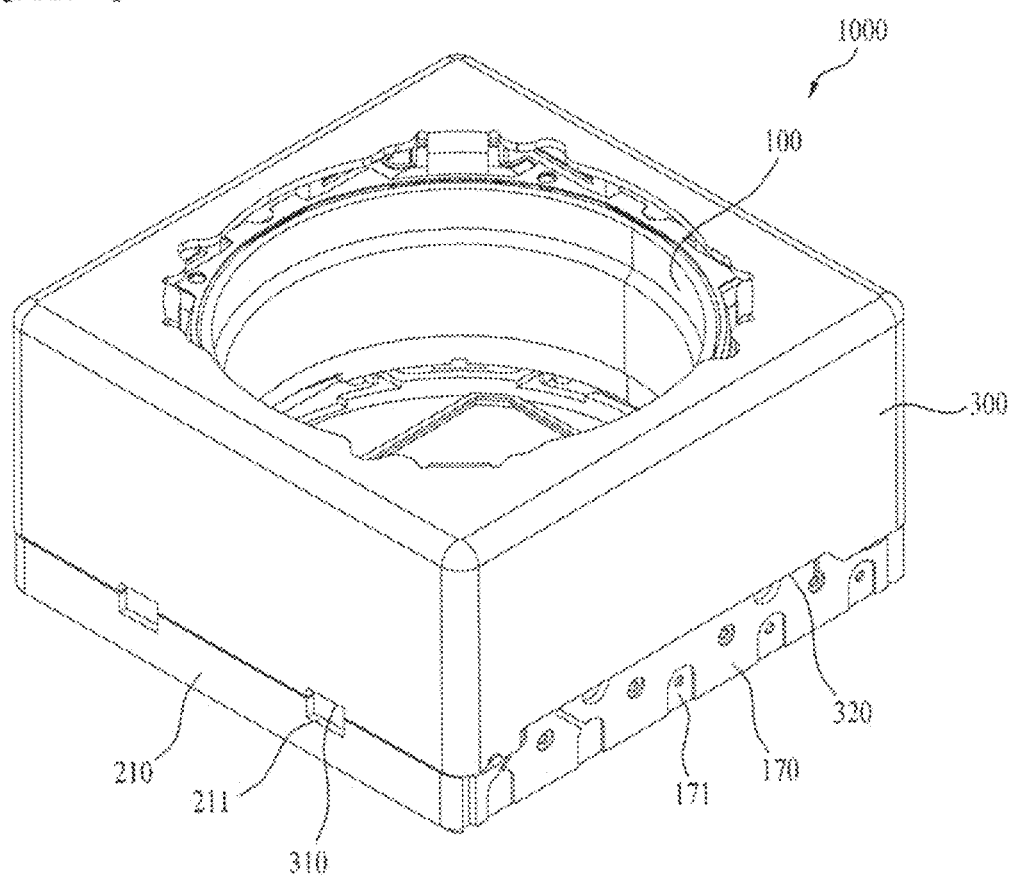

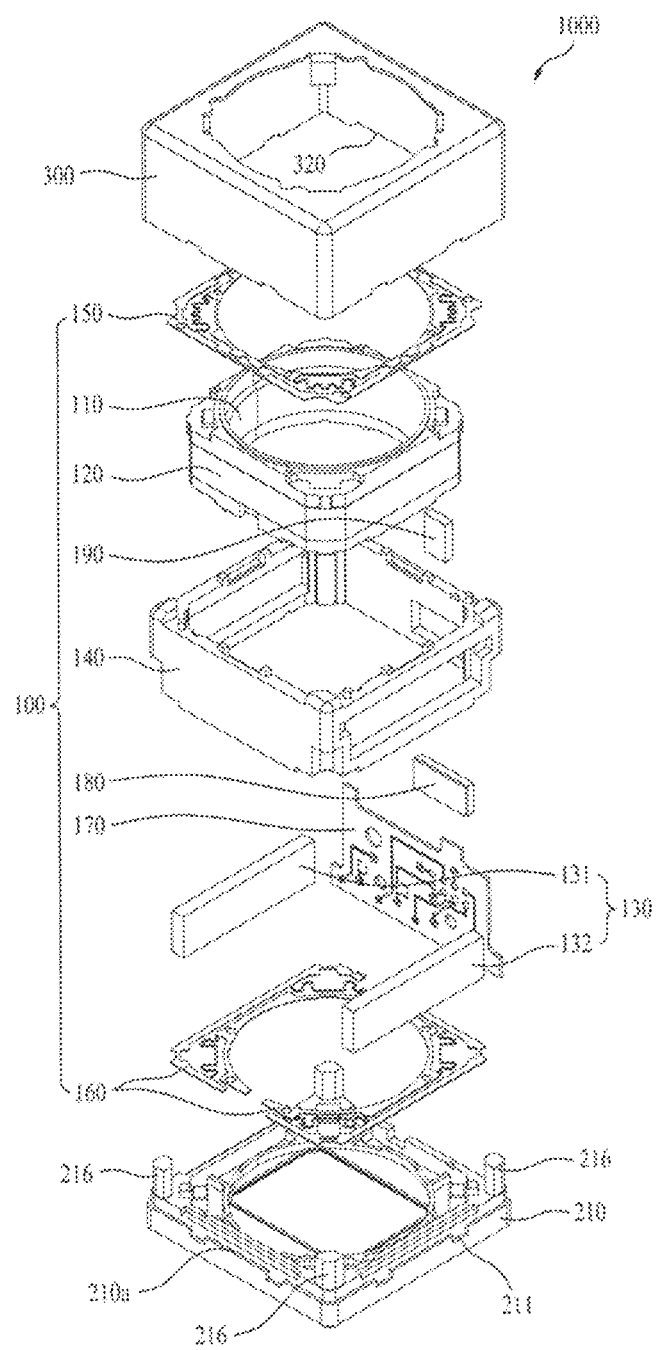
[FIG. 2]

[FIG. 3]
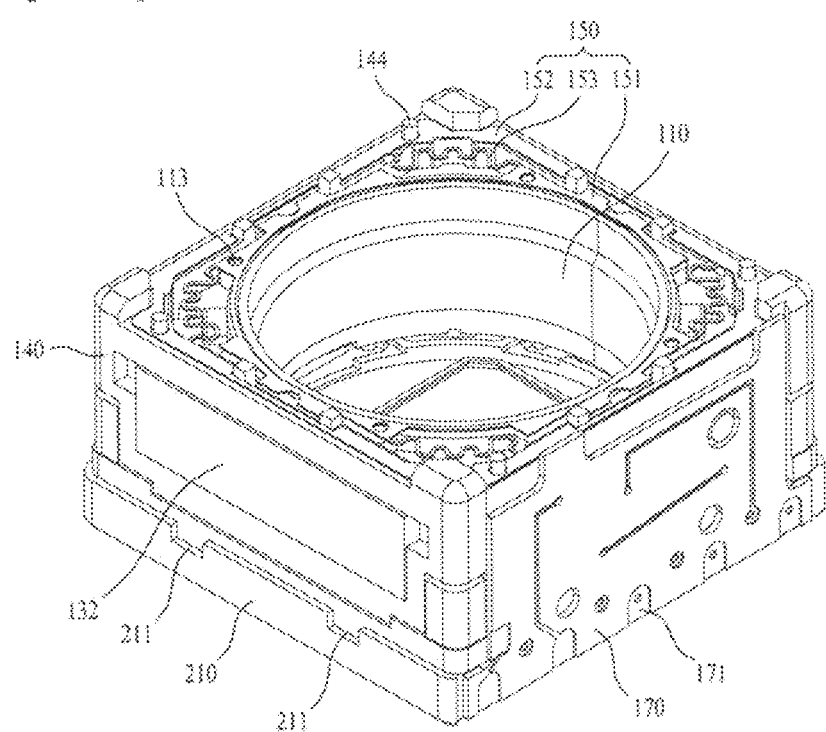

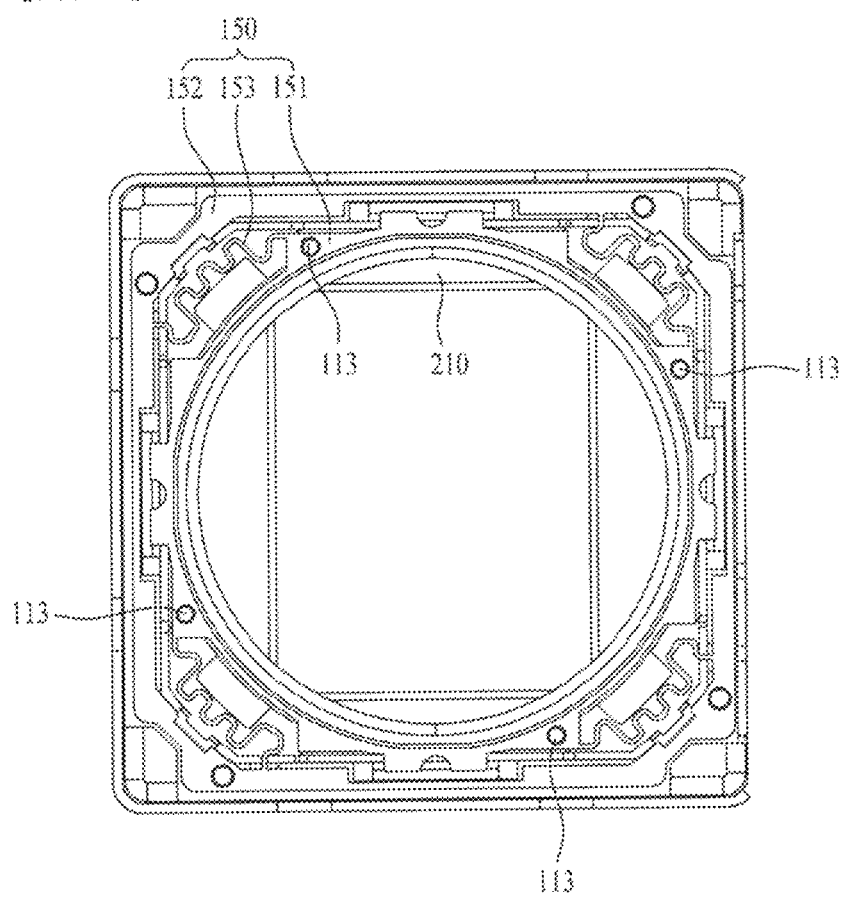

[FIG. 5]
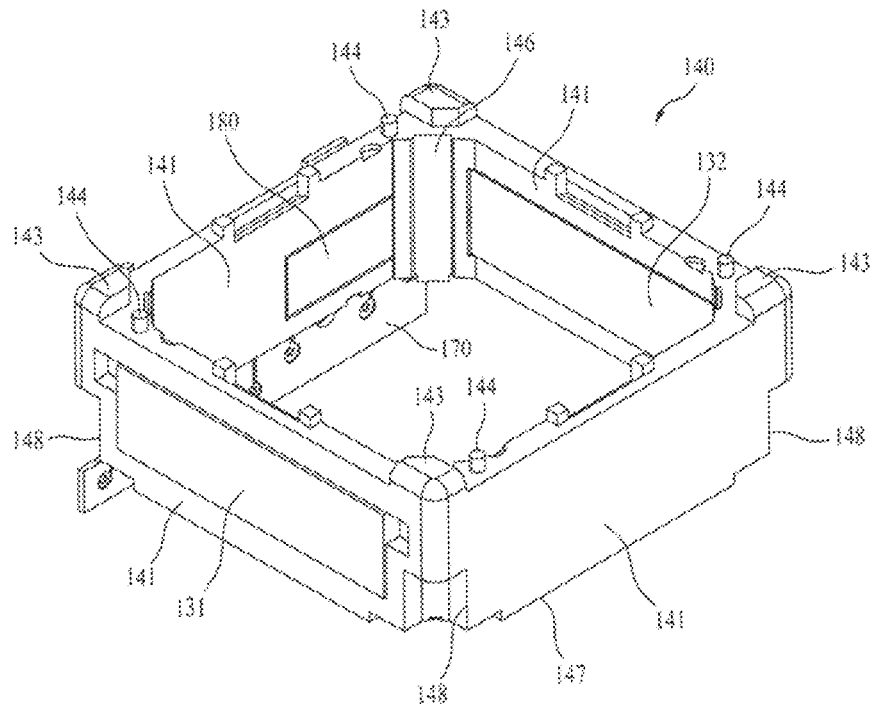
[FIG. 6]
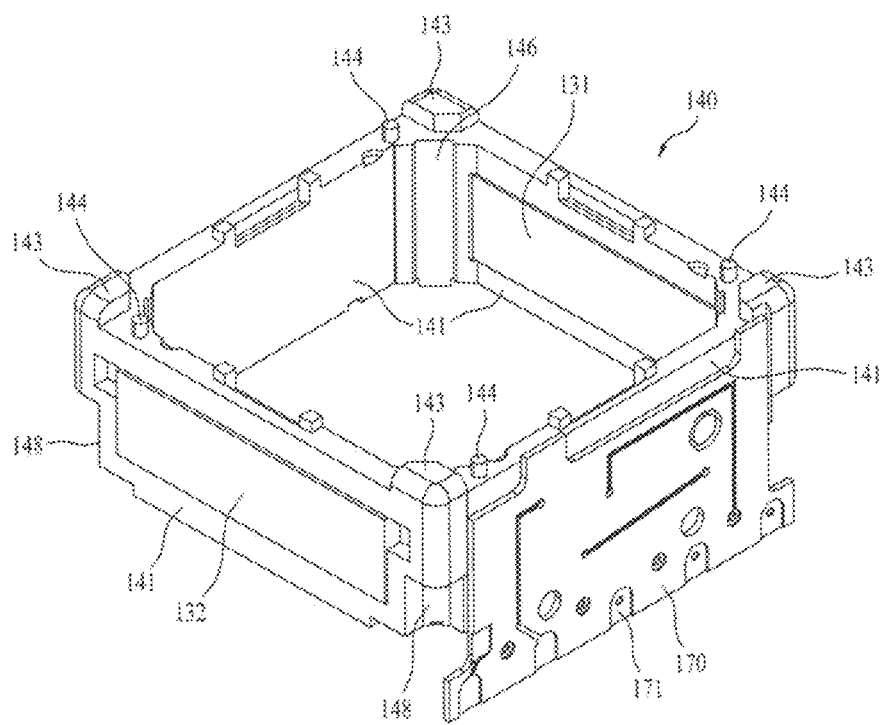

[FIG. 7]
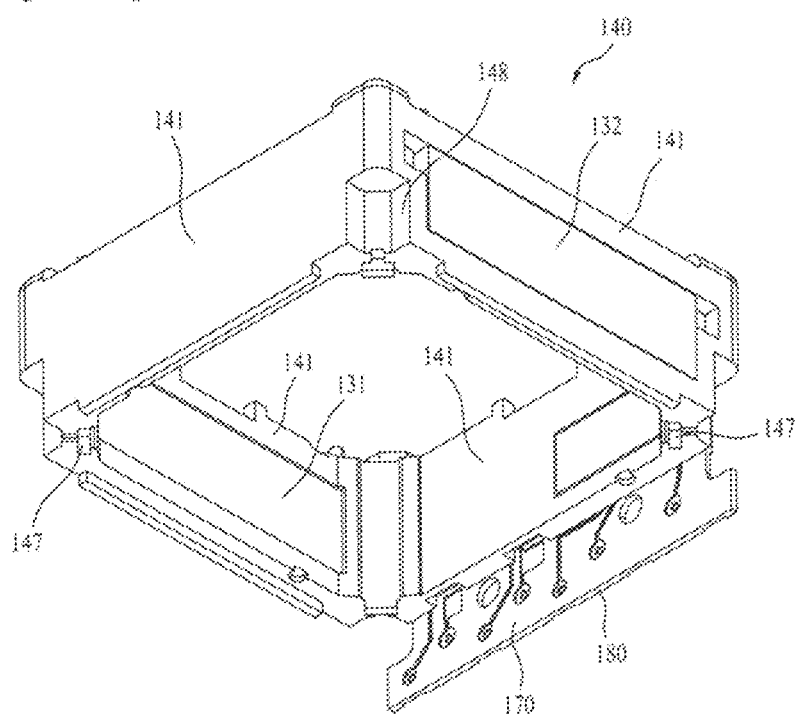

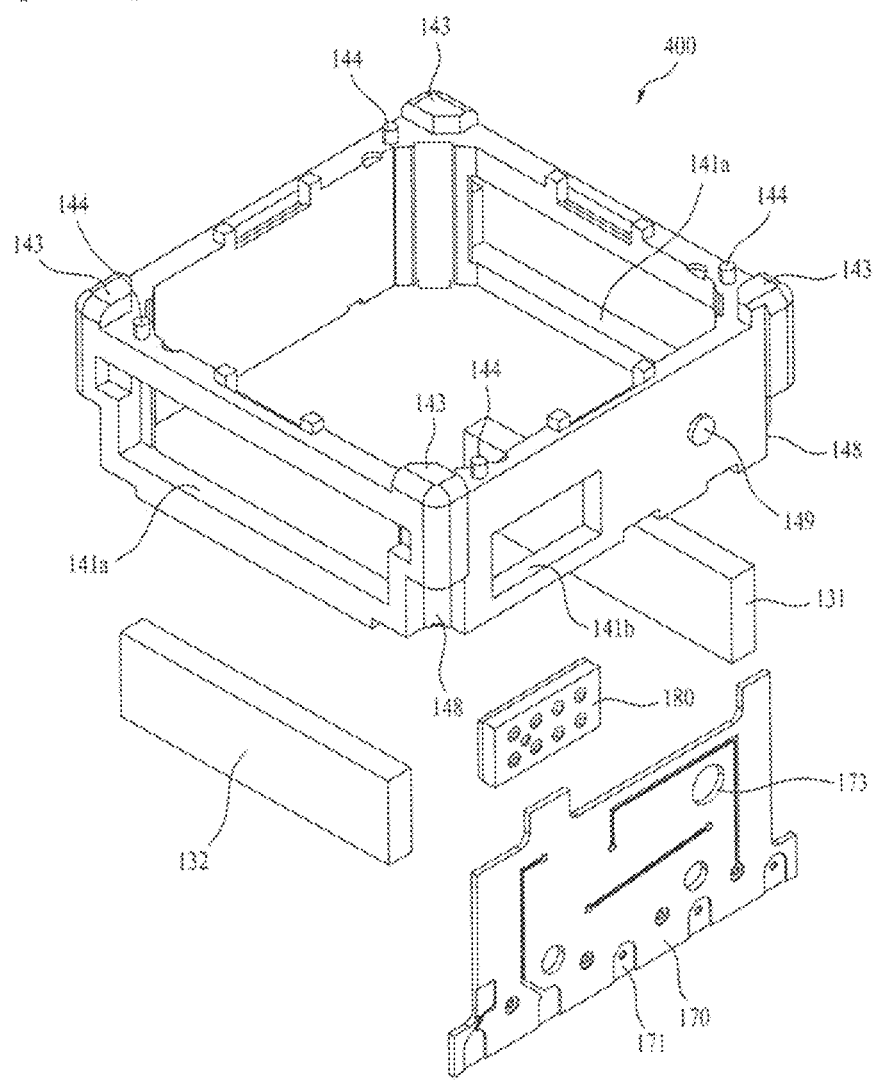

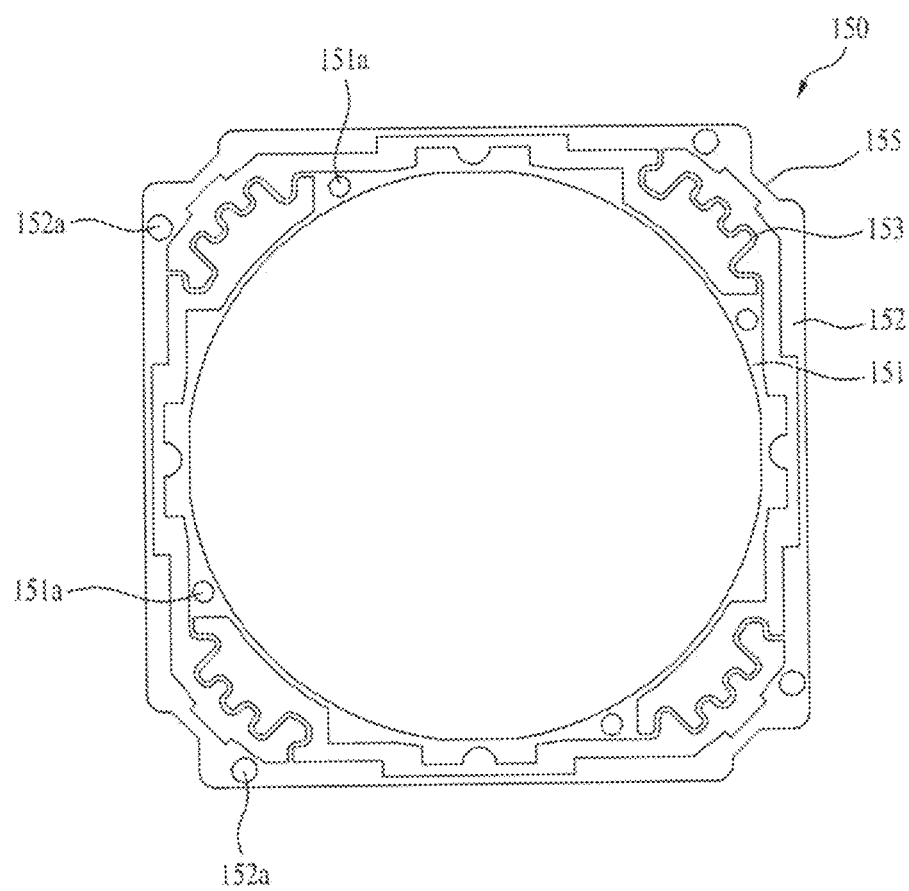
[FIG. 9]

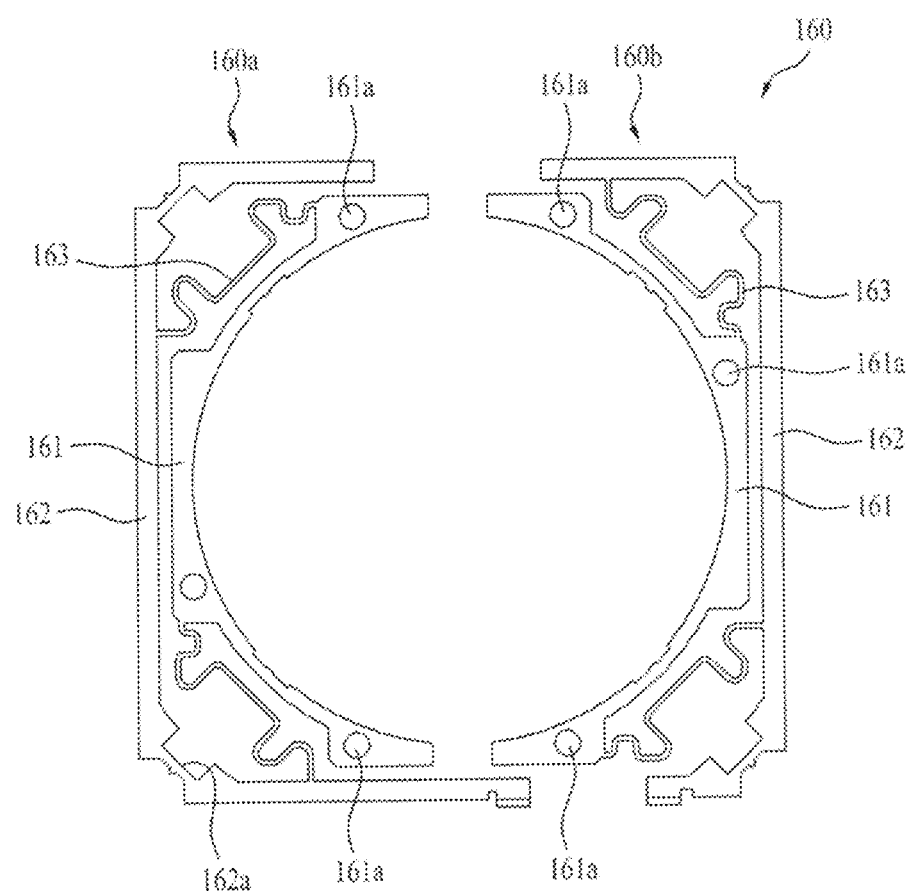
[FIG. 10]

[FIG. 11]
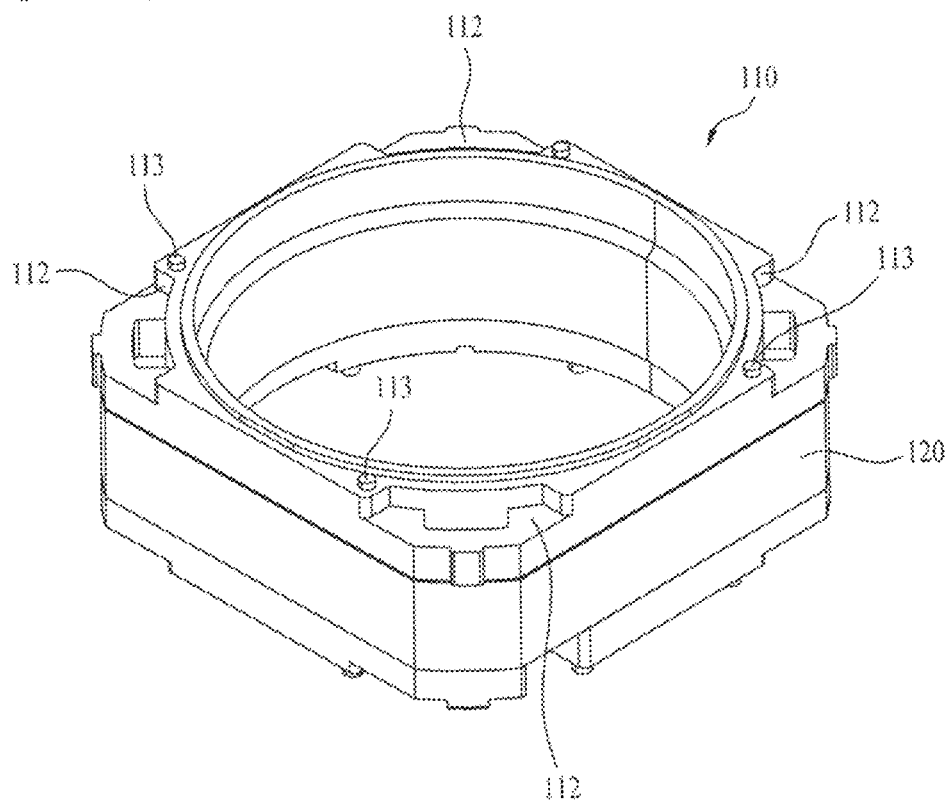
[FIG. 12]
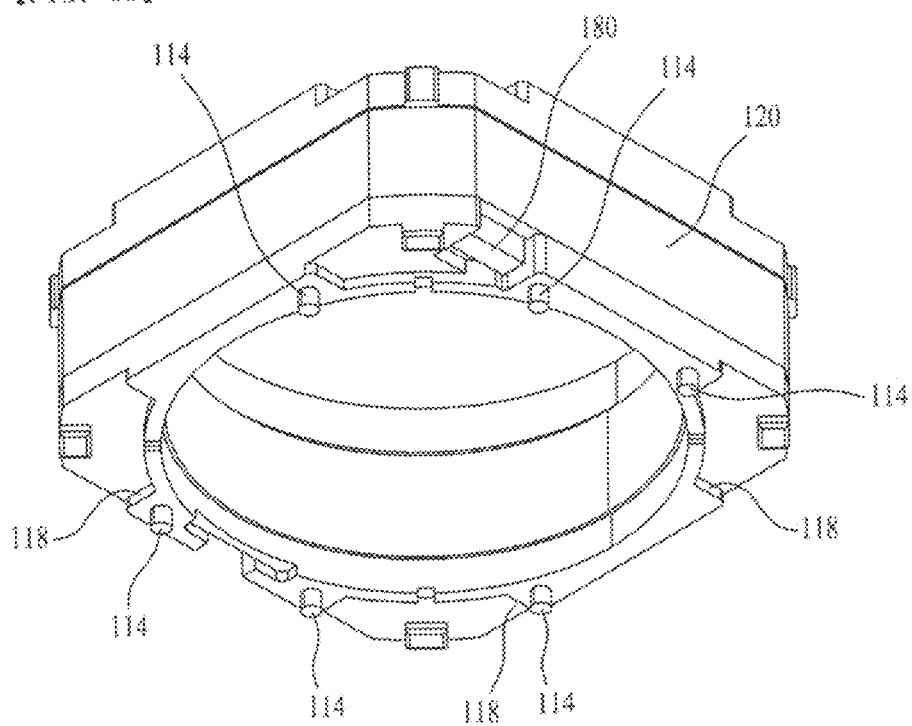

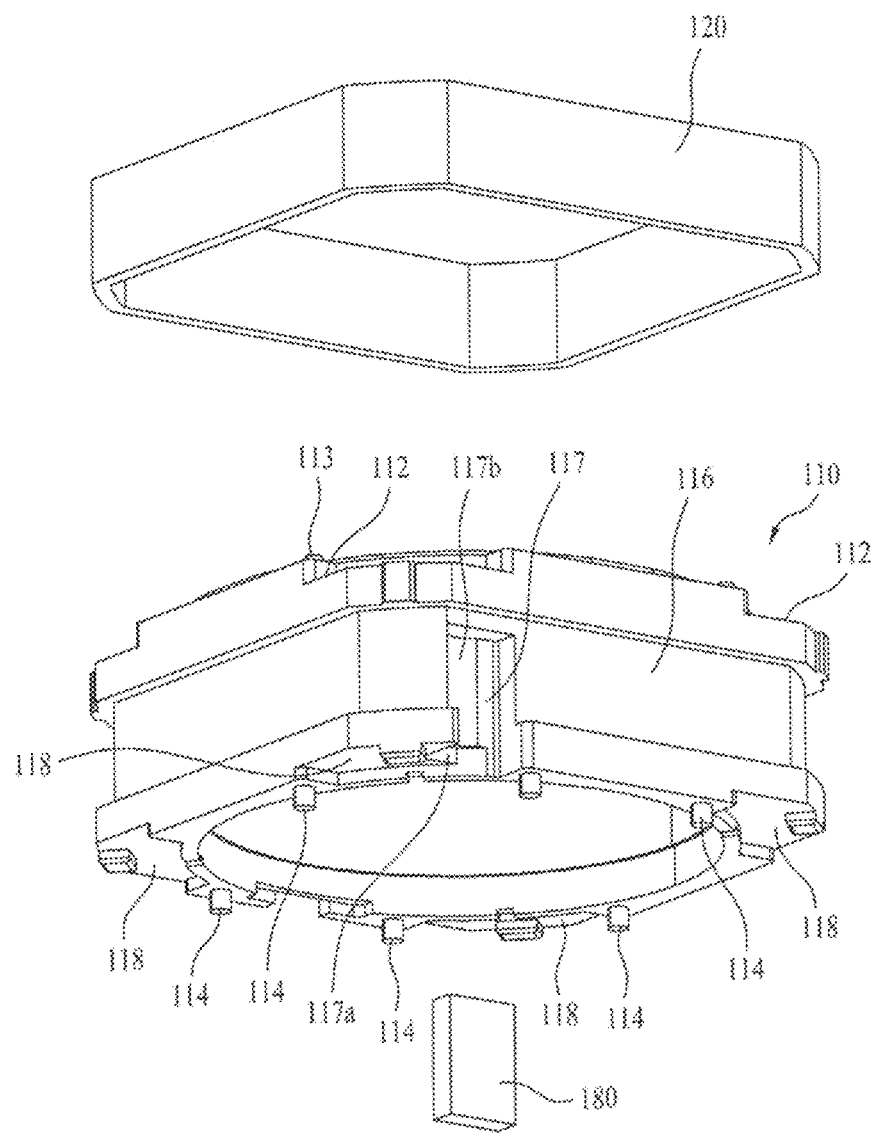
[FIG. 13]

[FIG. 14]
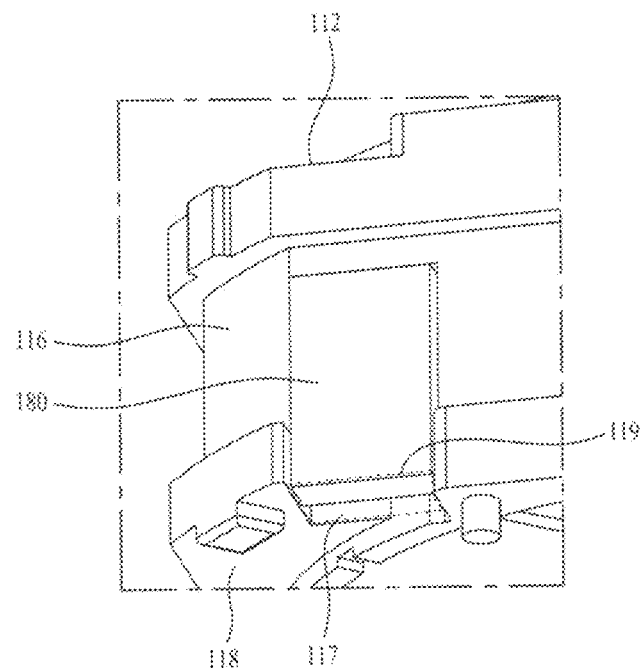
[FIG. 15]
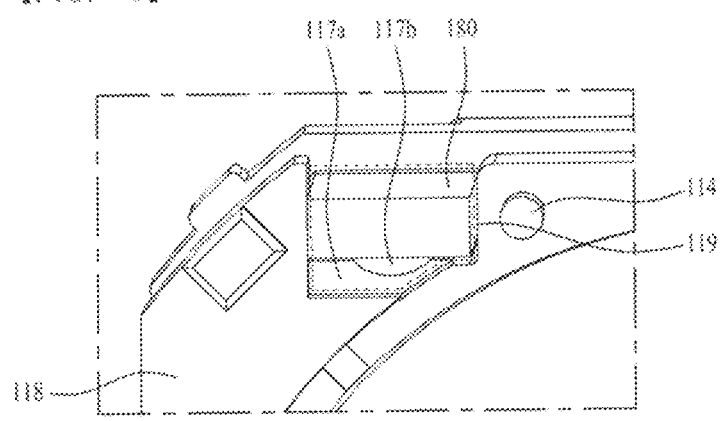

[FIG. 16]
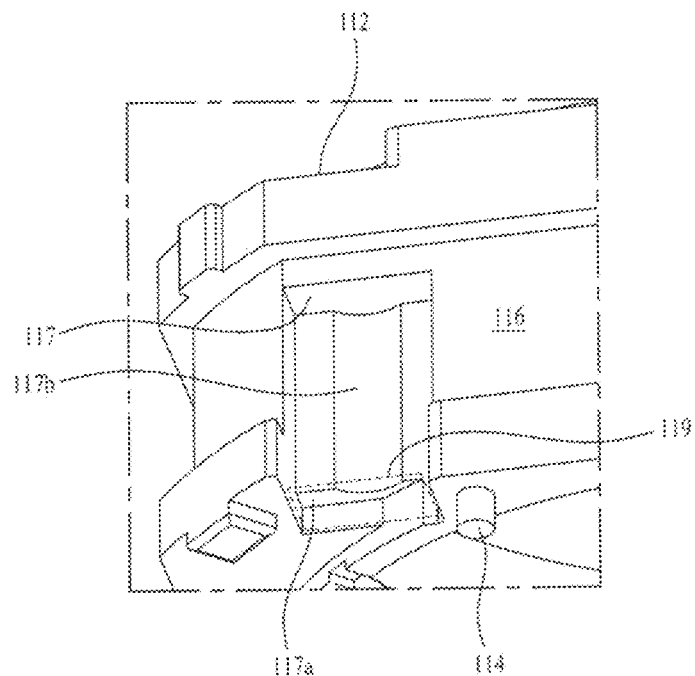
[FIG. 17]
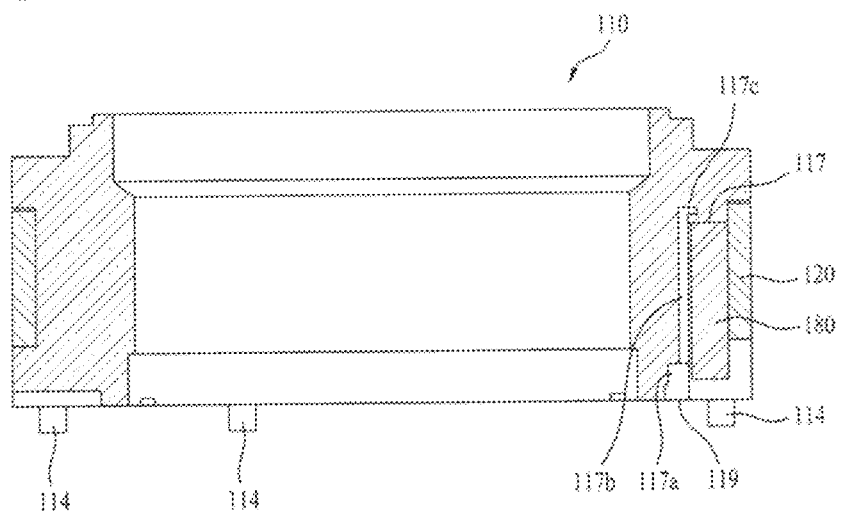

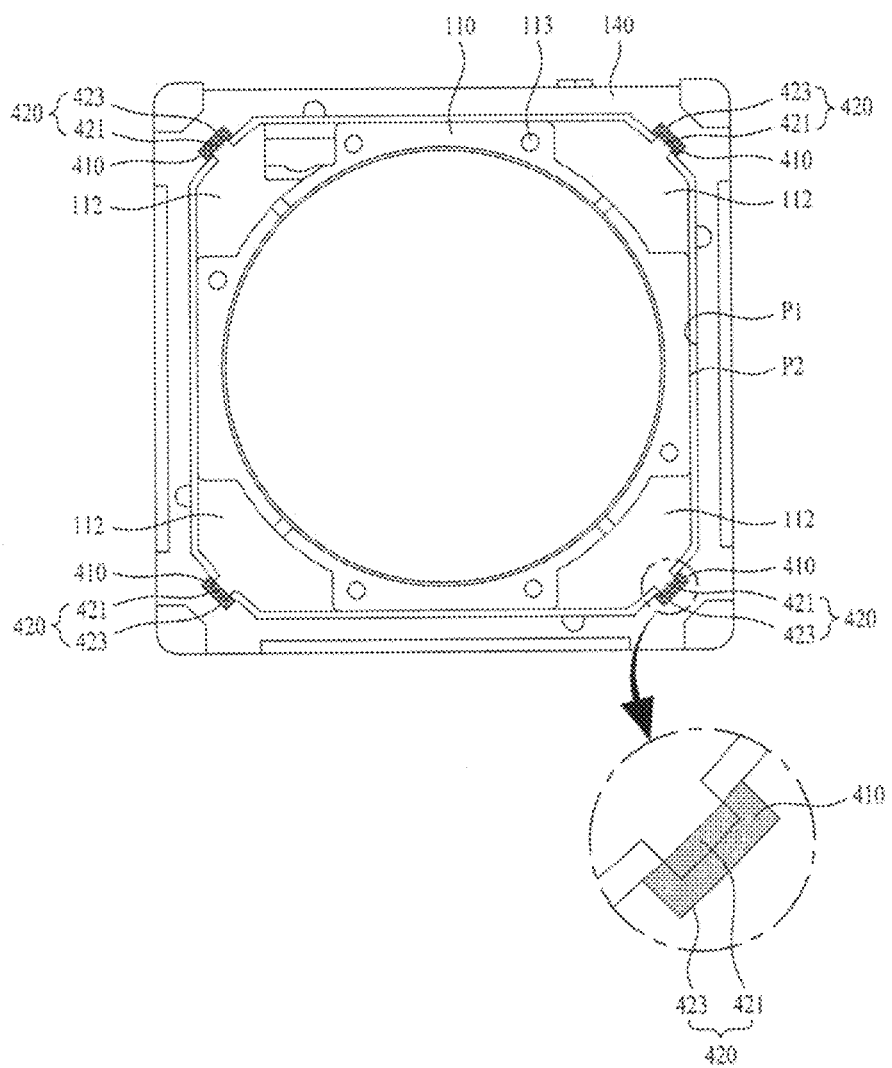
[FIG. 18]

[FIG. 19]
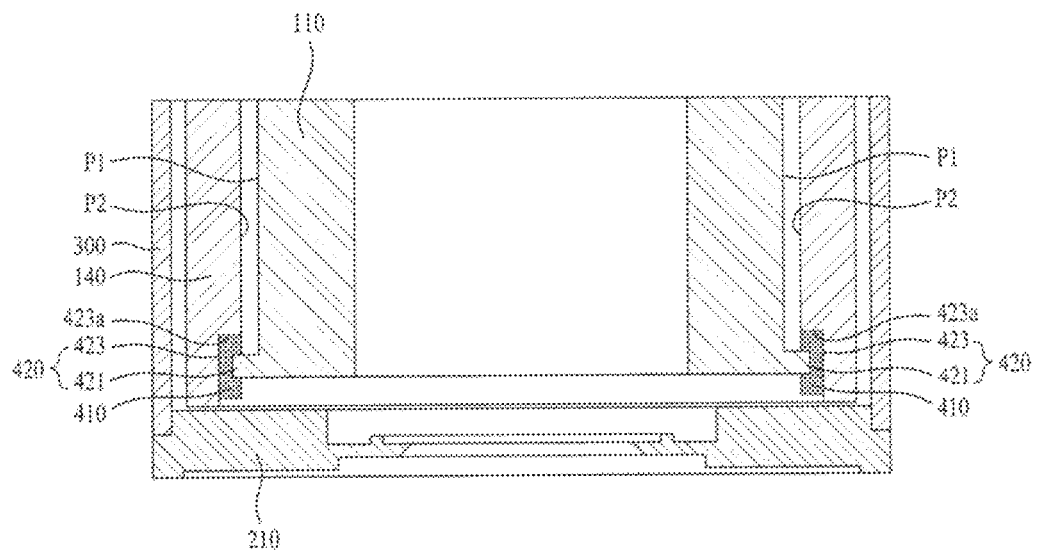
[FIG. 20]
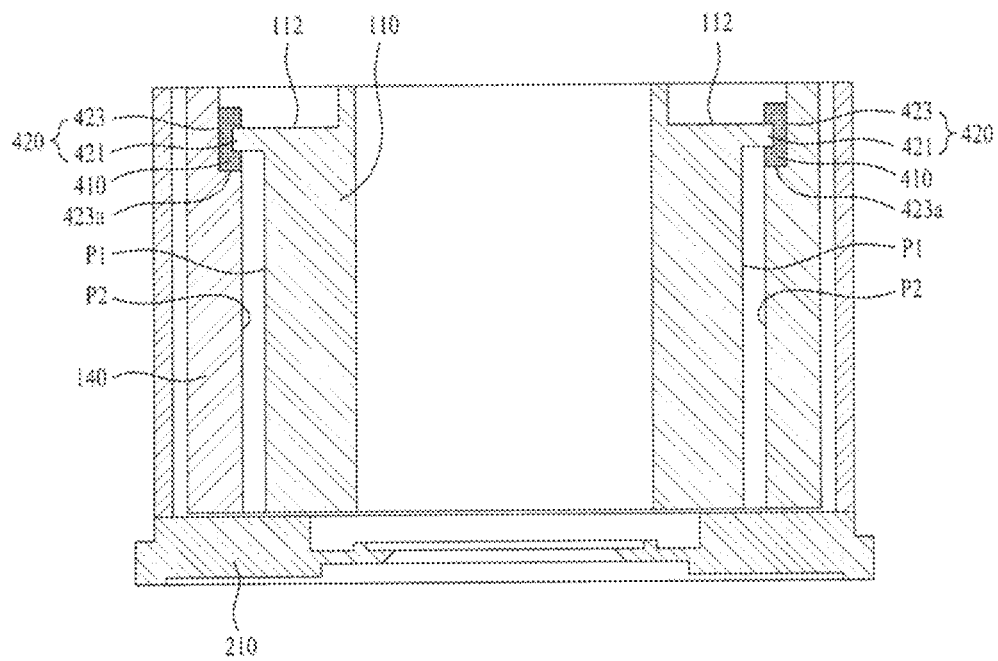

[FIG. 21]
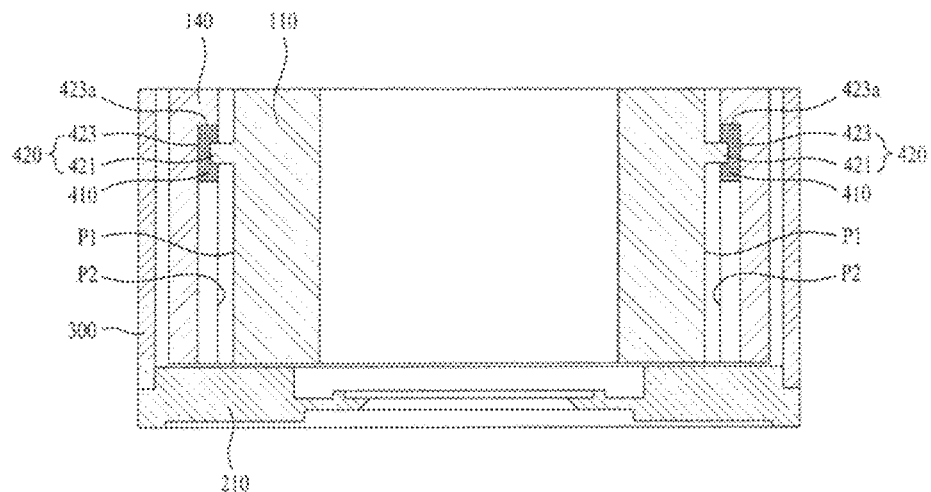
[FIG. 22]
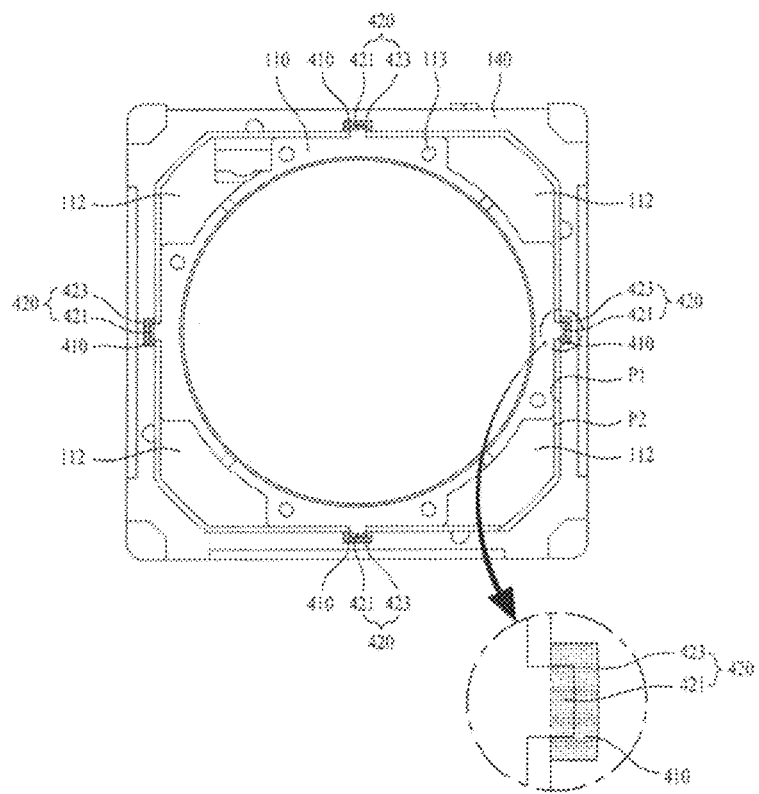

[FIG. 24]
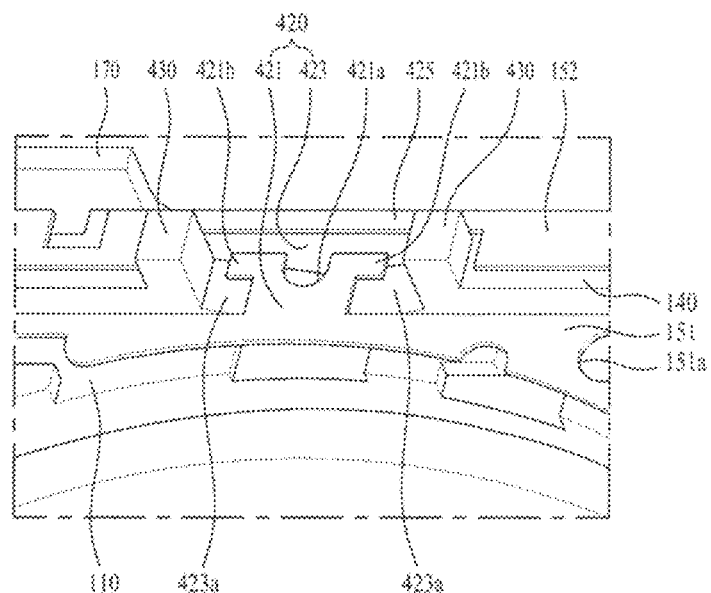
[FIG. 25]
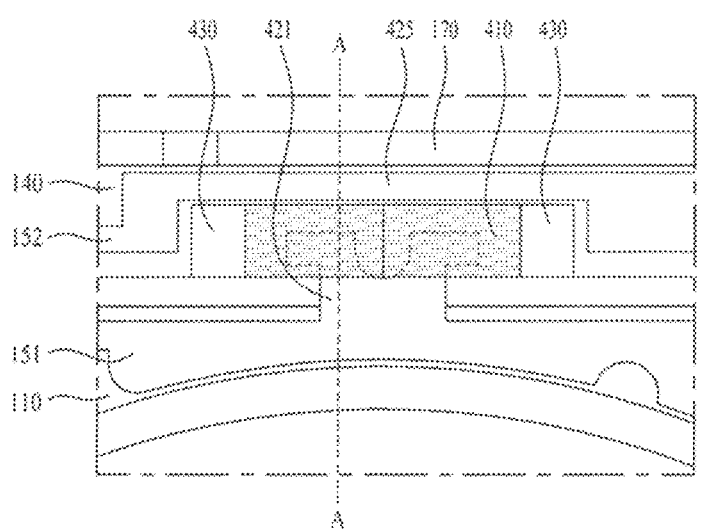

[FIG. 26]
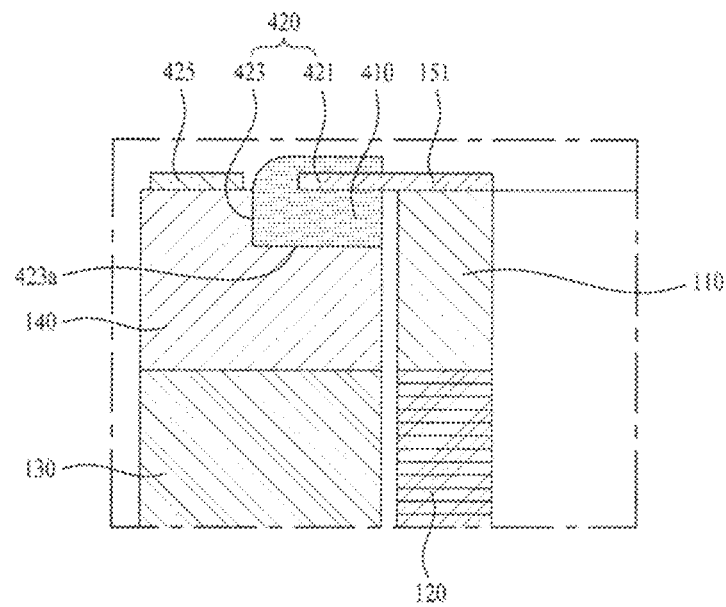
[FIG. 27]
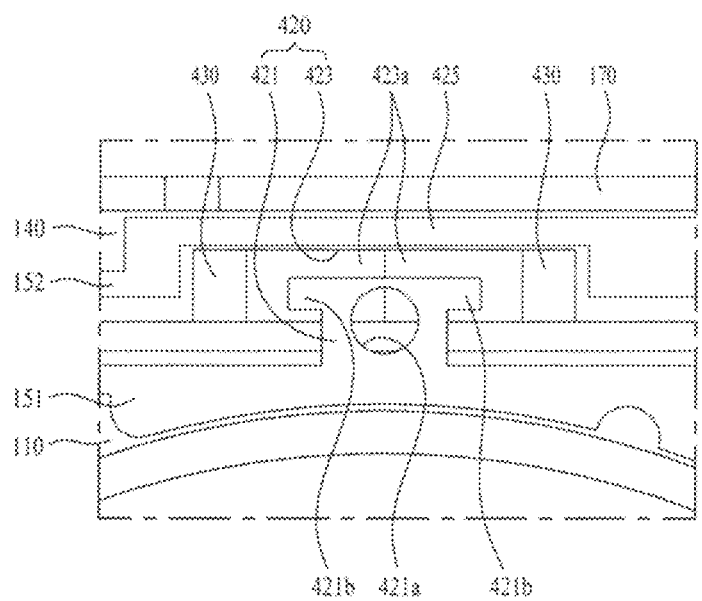

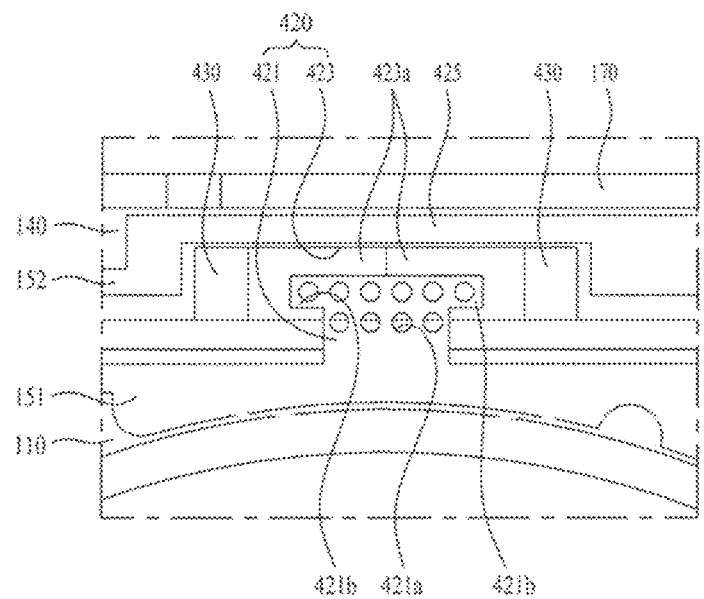
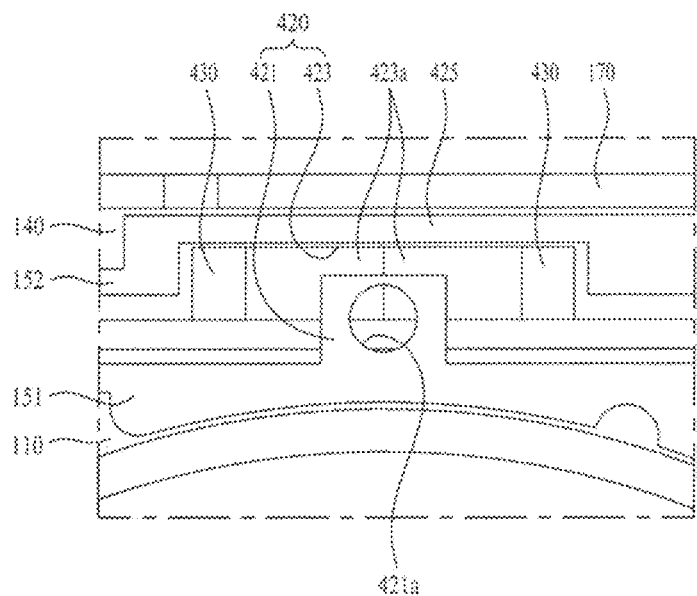

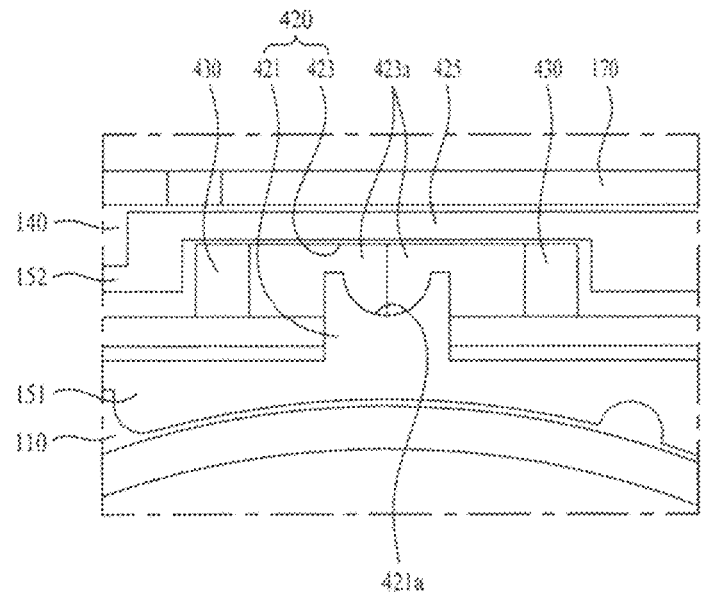
[FIG. 30]
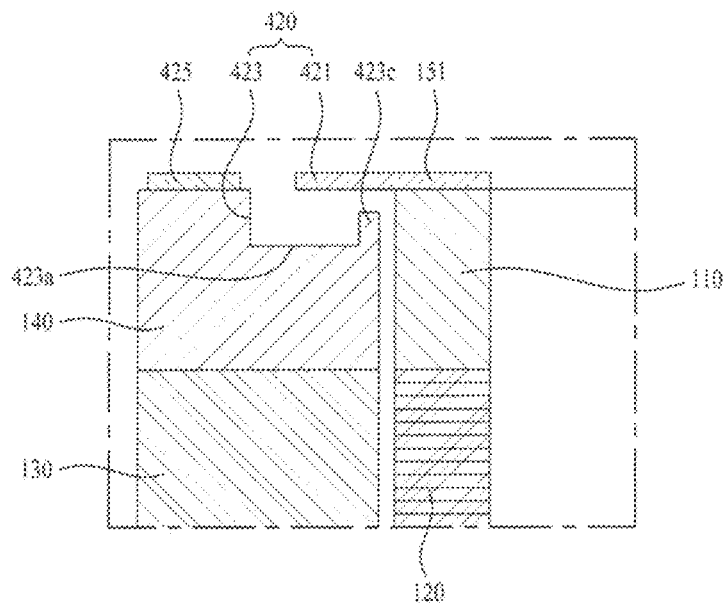
[FIG. 31]

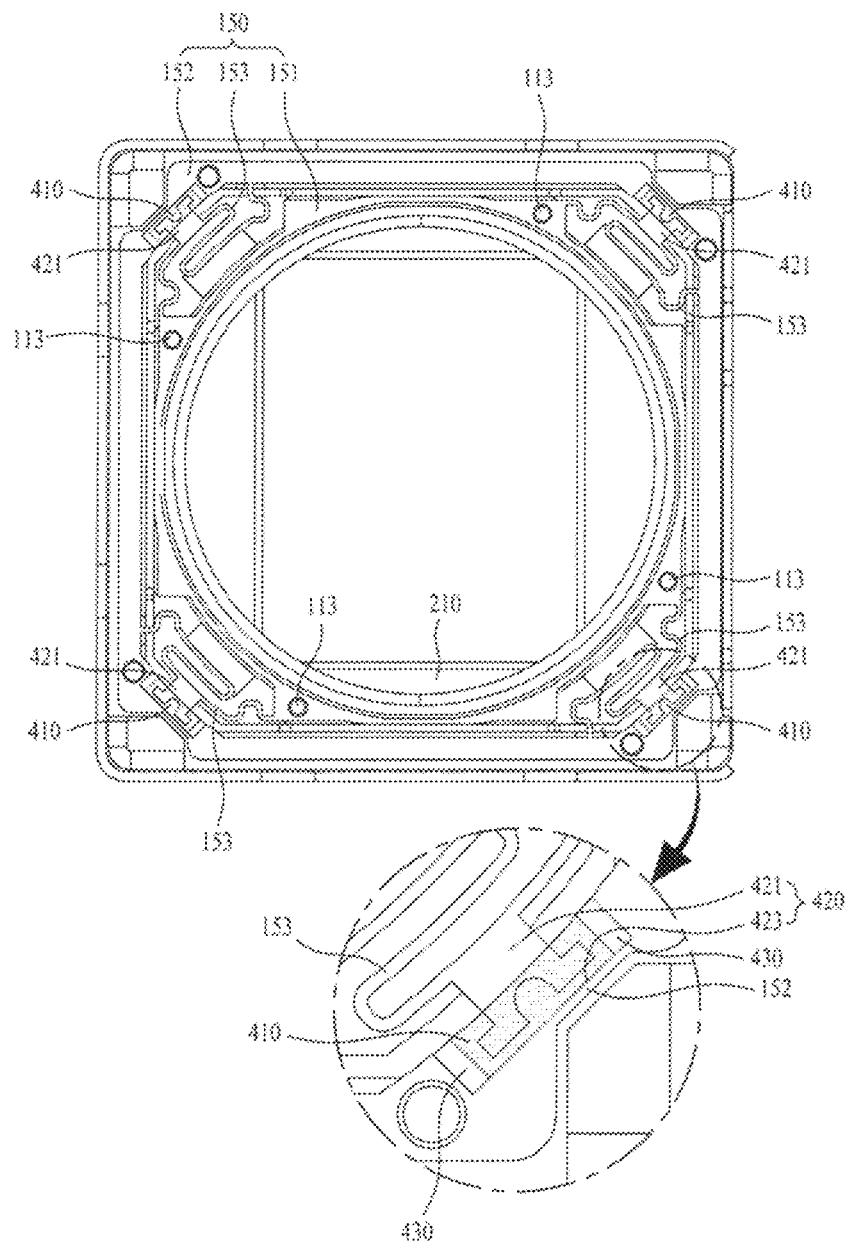
[FIG. 32]

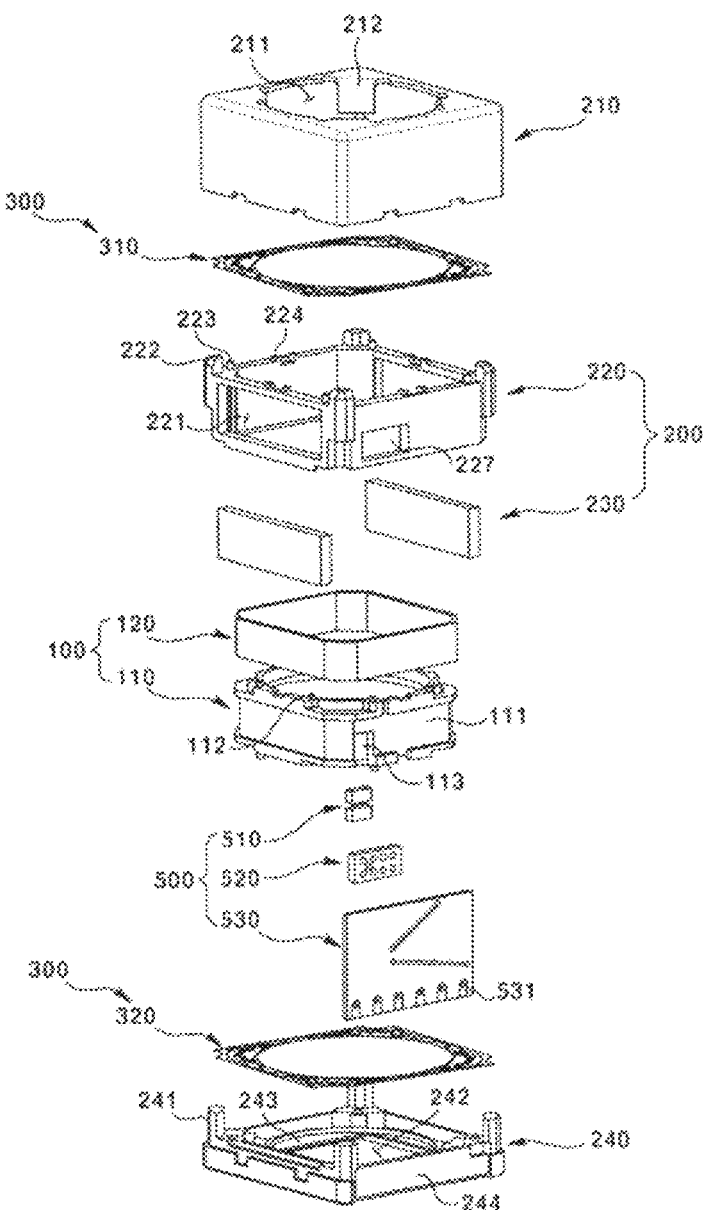
[FIG. 34]

[FIG. 35]
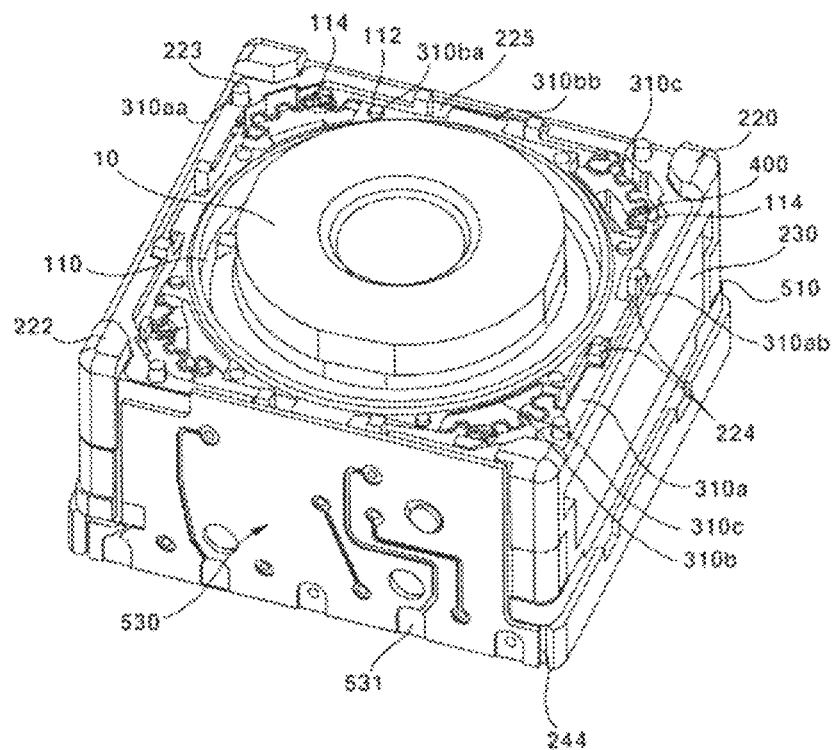
[FIG. 36]
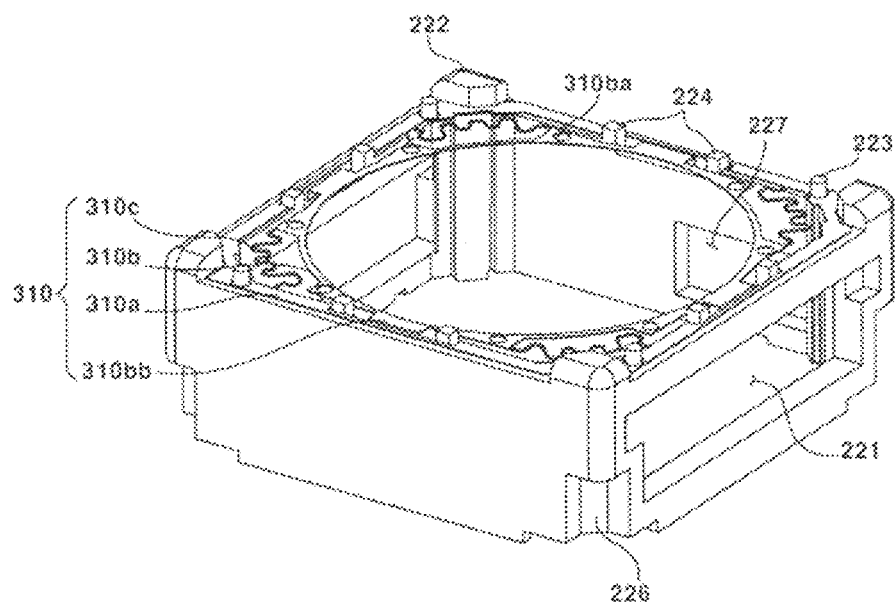

[FIG. 37]
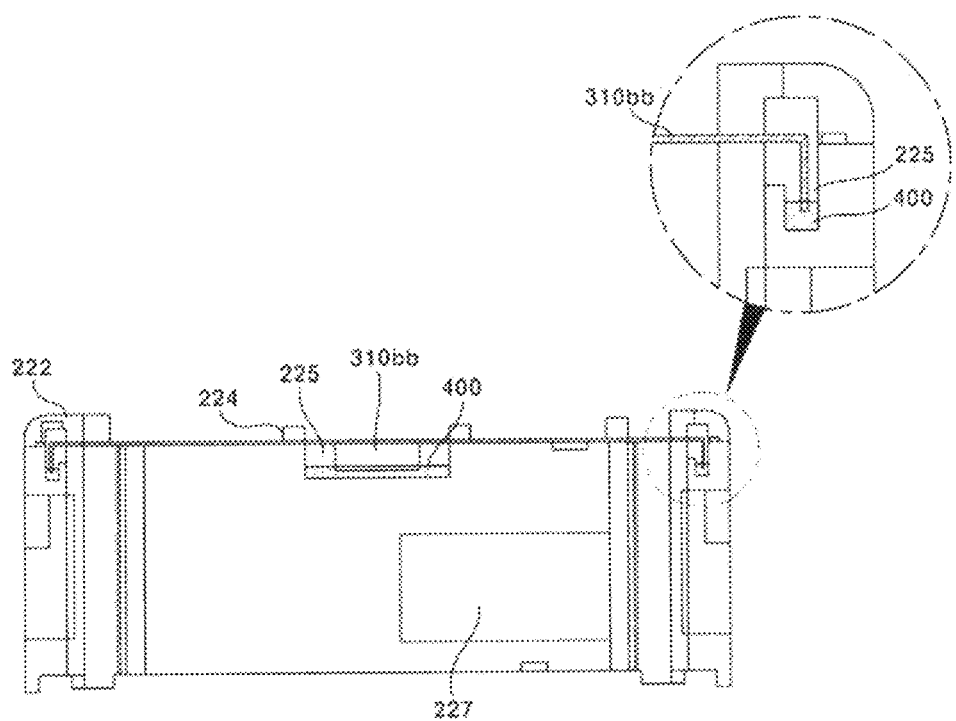

[FIG. 38]
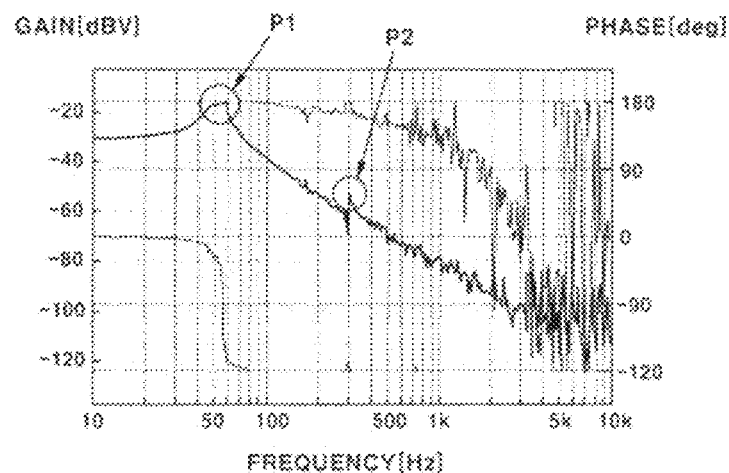
(a)
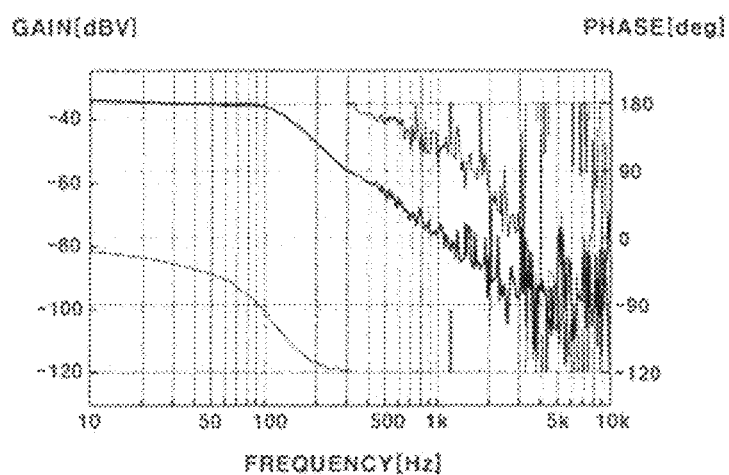
(b)

LENS MOVING APPARATUS

CROSS REFERENCE TO RELATED APPLICATION

This application is a Continuation of co-pending U.S. patent application Ser. No. 15/827,218 filed on Nov. 30, 2017, which is a Continuation of U.S. patent application Ser. No. 14/694,004 filed on Apr. 23, 2015 (now U.S. Pat. No. 9,857,555 issued on Jan. 2, 2018), which claims priority under 35 U.S.C. § 119 to Korean Patent Application No. 10-2014-0049273, filed in Korea on 24 Apr. 2014, No. 10-2014-0055362, filed in Korea on 9 May 2014, and No. 10-2014-0096577, filed in Korea on 29 Jul. 2014, which are hereby incorporated in their entirety by reference as if fully set forth herein.

TECHNICAL FIELD

Embodiments relate to a lens moving apparatus and, more particularly, to a lens moving apparatus which prevents resonance of a bobbin in the optical axis direction by alleviating vibration of the bobbin in the optical axis direction during movement of a lens or implementation of auto-focusing.

BACKGROUND

In recent years, IT products equipped with subminiature digital cameras such as, for example, cellular phones, smartphones, tablet PCs, and notebook computers, have actively been developed.

IT products equipped with conventional subminiature digital cameras incorporate a lens moving apparatus for aligning the focal distance of a lens by adjusting a distance between the lens and an image sensor that converts outside light into a digital image.

However, the conventional subminiature digital cameras are configured to implement a control operation for determining a point of the image sensor, where the most distinct image is produced, based on the definition of the digital image formed on the image sensor that depends on the distance between the lens and the image sensor for implementation of auto-focusing. During implementation of auto-focusing as described above, a bobbin equipped with the lens is moved in the optical axis direction. This movement of the bobbin in the optical axis direction, however, may cause vibration of the bobbin in the optical axis direction. When the frequency of vibration of the bobbin in the optical axis direction becomes close to or coincides with the natural frequencies of vibration of the bobbin and a housing, problematic resonance may occur between the bobbin and the housing which are connected to each other through an elastic member.

SUMMARY

Accordingly, the present embodiment provides a lens moving apparatus to solve problems of the related art. More specifically, the present embodiment provides a lens moving apparatus to remove resonance during movement of a lens or implementation of auto-focusing. In addition, the present embodiment provides a lens moving apparatus to more efficiently remove resonance during movement of a lens or implementation of auto-focusing.

In one embodiment, a lens moving apparatus includes a housing supporting a driving magnet and having an opening, a bobbin provided at an outer circumferential surface thereof with a coil located inside the driving magnet, the bobbin being moved in a first direction parallel to an optical axis within the housing via electromagnetic interaction between the driving magnet and the coil, and a damper located between the housing and the bobbin.

In another embodiment, a lens moving apparatus includes a housing supporting a driving magnet and having an opening, a bobbin provided at an outer circumferential surface thereof with a coil located inside the driving magnet, the bobbin being moved in a first direction parallel to an optical axis within the housing via electromagnetic interaction between the driving magnet and the coil, an upper elastic member and a lower elastic member provided respectively at upper surfaces and lower surfaces of the bobbin and the housing, each elastic member including an inner frame coupled to the bobbin and an outer frame coupled to the housing, and a damper located between the inner frame of at least one elastic member among the upper elastic member and the lower elastic member and the housing.

In a further embodiment, a lens moving apparatus includes a moving unit including a bobbin, a stationary unit including a housing outwardly spaced apart from the bobbin by a prescribed distance to move the moving unit, an elastic unit connected to the bobbin and the housing to provide the moving unit with return force, and a damper member located between the housing and the elastic unit.

BRIEF DESCRIPTION OF THE DRAWINGS

Arrangements and embodiments may be described in detail with reference to the following drawings in which like reference numerals refer to like elements and wherein:

FIG. 1 is a schematic perspective view illustrating a lens moving apparatus according to an embodiment;

FIG. 2 is a schematic exploded perspective view illustrating the lens moving apparatus according to the embodiment;

FIG. 3 is a schematic perspective view illustrating the lens moving apparatus after removal of a cover member as compared to FIG. 1;

FIG. 4 is a schematic plan view of FIG. 3;

FIG. 5 is a schematic perspective view illustrating a housing according to the embodiment;

FIG. 6 is a schematic perspective view illustrating the housing viewed from a different angle than FIG. 5;

FIG. 7 is a schematic bottom perspective view illustrating the housing according to the embodiment;

FIG. 8 is a schematic exploded perspective view illustrating the housing according to the embodiment;

FIG. 9 is a schematic plan view illustrating an upper elastic member according to the embodiment;

FIG. 10 is a schematic plan view illustrating a lower elastic member according to the embodiment;

FIG. 11 is a schematic perspective view illustrating a bobbin according to the embodiment;

FIG. 12 is a schematic bottom perspective view illustrating the bobbin according to the embodiment;

FIG. 13 is a schematic exploded perspective view illustrating the bobbin according to the embodiment;

FIG. 14 is a partially enlarged perspective view of FIG. 13;

FIG. 15 is a partially enlarged bottom view of FIG. 13;

FIG. 16 is a schematic partially enlarged perspective view illustrating a receiving recess according to the embodiment;

FIG. 17 is a schematic longitudinal sectional view illustrating the bobbin according to the embodiment;

FIG. 18 is a bottom view illustrating the bobbin and the housing according to the embodiment;

FIG. 19 is a schematic longitudinal sectional view illustrating the bobbin, the housing, and the cover member according to one embodiment;

FIG. 20 is a schematic longitudinal sectional view illustrating the bobbin, the housing, and the cover member according to another embodiment;

FIG. 21 is a schematic longitudinal sectional illustrating the bobbin and the cover member according to a further embodiment;

FIG. 22 is a schematic bottom side view illustrating the bobbin and the housing according to another embodiment;

FIG. 24 is a schematic partially enlarged perspective view illustrating a damper and a damping connector according to one embodiment;

FIG. 25 is a schematic partially enlarged plan view illustrating the damper and the damping connector according to the embodiment;

FIG. 26 is a schematic partially enlarged longitudinal sectional view illustrating the damper and the damping connector according to the embodiment taken along line A-A of FIG. 25;

FIG. 27 is a schematic partially enlarged plan view illustrating a damping protrusion according to a first additional embodiment;

FIG. 28 is a schematic partially enlarged plan view illustrating a damping protrusion according to a second additional embodiment;

FIG. 29 is a schematic partially enlarged plan view illustrating a damping protrusion according to a third additional embodiment;

FIG. 30 is a schematic partially enlarged plan view illustrating a damping protrusion according to a fourth additional embodiment;

FIG. 31 is a schematic longitudinal sectional view illustrating a damping receiving recess according to an additional embodiment;

FIG. 32 is a schematic plan view and a partially enlarged view illustrating a damper and a damping connector according to another embodiment;

FIG. 34 is an exploded perspective view illustrating a lens moving apparatus according to another embodiment;

FIG. 35 is a perspective view illustrating a lens moving apparatus having no cover member according to the embodiment;

FIG. 36 is a view illustrating a housing and an upper elastic member according to the embodiment;

FIG. 37 is a side sectional view of FIG. 36; and

FIG. 38 is a view illustrating graphic curves acquired during movement of the conventional lens moving apparatus and the lens moving apparatus according to the embodiment.

DESCRIPTION OF SPECIFIC EMBODIMENTS

Figure 23A:
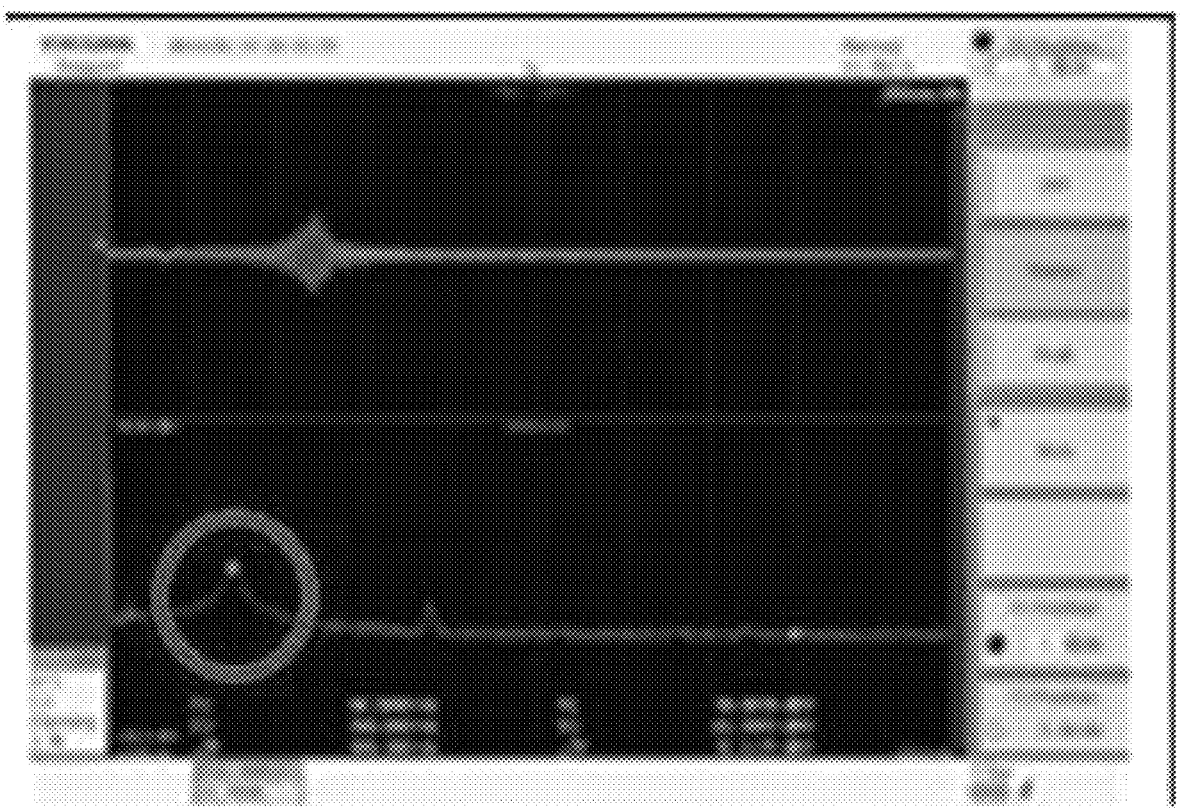
FIG. 23A is a graph illustrating optical axis directional vibration of a conventional lens moving apparatus having no damper.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciated that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

First Embodiment

FIG. 1 is a schematic perspective view illustrating a lens moving apparatus 100 according to an embodiment, FIG. 2 is a schematic exploded perspective view illustrating the lens moving apparatus 100 according to the embodiment, FIG. 3 is a schematic perspective view illustrating the lens moving apparatus 100 after removal of a cover member 300 as compared to FIG. 1, FIG. 4 is a schematic plan view of FIG. 3, FIG. 5 is a schematic perspective view illustrating a housing 140 according to the embodiment, FIG. 6 is a schematic perspective view illustrating the housing 140 viewed from a different angle than FIG. 5, FIG. 7 is a schematic bottom perspective view illustrating the housing 140 according to the embodiment, FIG. 8 is a schematic exploded perspective view illustrating the housing 140 according to the embodiment, FIG. 9 is a schematic plan view illustrating an upper elastic member 150 according to the embodiment, and FIG. 10 is a schematic plan view illustrating a lower elastic member 160 according to the embodiment.

The lens moving apparatus 100 according to the present embodiment is an apparatus that adjusts a distance between an image sensor and a lens of a camera module to position the image sensor at the focal distance of the lens. That is, the lens moving apparatus 100 functions to implement autofocusing.

As exemplarily illustrated in FIGS. 1 to 4, the lens moving apparatus 100 according to the present embodiment includes a cover member 300, an upper elastic member 150, a bobbin 110, a coil 120 wound around the bobbin 110, a housing 140, driving magnets 130 and a printed circuit board 170 affixed to the housing 140, a lower elastic member 160, a base 210, a displacement sensing unit to determine a displacement of the bobbin 110 in the optical axis direction (i.e. in a first direction), and a damper serving as an alleviator.

The cover member 300 generally takes the form of a box and is configured to be coupled to the top of the base 210. The cover member 300 defines a receiving space along with the base 210. The upper elastic member 150, the bobbin 110, the coil 120 wound around the bobbin 110, the housing 140, and the driving magnets 130 and the printed circuit board 170 affixed to the housing 140 are received in the receiving space.

The cover member 300 has an opening formed in an upper surface thereof to allow a lens coupled to the bobbin 110 to be exposed to outside light. In addition, the opening may be provided with a window formed of a light transmitting material. As such, it is possible to prevent impurities, such as, for example, dust or moisture, from entering the camera module.

The cover member 300 may have first recesses 310 formed in a lower end thereof. At this time, although will be described below, the base 210 may have second recesses 211 at portions thereof coming into contact with the first recesses 310 when the cover member 300 and the base 210 are coupled to each other (i.e. at positions corresponding to the first recesses 310). Upon coupling of the cover member 300 and the base 210, recesses each having a given area may be formed via merger of the first recesses 310 and the second recesses 211. A viscous adhesive member may be applied to the recesses. That is, the adhesive member applied to the recesses may be changed into a gap between facing surfaces of the cover member 300 and the base 210 through the recesses, thereby allowing the cover member 300 and the base 210 to be coupled to each other and sealing the gap between the cover member 300 and the base 210. In addition, the adhesive member may hermetically seal side surfaces of the cover member 300 and the base 210 as the cover member 300 and the base 210 are coupled to each other.

In addition, the cover member 300 may have a third recess 320 formed in a surface thereof corresponding to a terminal surface of the printed circuit board 170, so as not to interfere with a plurality of terminals formed at the terminal surface. The third recess 320 may be indented in the entire surface facing the terminal surface. As the adhesive member is applied inside the third recess 320, the cover member 300, the base 210 and the printed circuit board 170 may be sealed. In addition, the adhesive member may hermetically seal side surfaces of the cover member 300 and the base 210 as the cover member 300 and the base 210 are coupled to each other.

Although the first recesses 310, the second recesses 320, and the third recess 320 are formed respectively at the base 210 and the cover member 300, the embodiment is not limited thereto and recesses having similar shapes may be formed only in the base 210 or may be formed only in the cover member 300.

The base 210 may generally have a square shape and define a space for receiving the bobbin 110 and the housing 140 by being coupled to the cover member 300.

The base 210 has a protruding portion that protrudes outward by a prescribed thickness so as to surround a lower rim of the base 210. The prescribed thickness of the protruding portion may be equal to the thickness of the side surface of the cover member 300. When the cover member 300 is coupled to the base 210, the side surface of the cover member 300 may be seated on, come into contact with, be disposed on, or be coupled to an upper surface or a side surface of the protruding portion. As a result, the protruding portion may guide the cover member 300 coupled to the top thereof by coming into surface contact with an end of the cover member 300. The end of the cover member 300 may include a bottom surface or side surface of the cover member 300. At this time, the protruding portion and the end of the cover member 300 may be attached to and sealed with each other using, for example, an adhesive.

The protruding portion may be provided with the second recesses 211 at positions corresponding to the first recesses 310 of the cover member 300. As described above, the second recesses 211 may be merged with the first recesses 310 of the cover member 300 to define the recesses and to define a space for charging of the adhesive member.

The base 210 has a central opening. The opening is formed at a position corresponding to a position of the image sensor arranged in the camera module.

In addition, the base 210 includes four guide members 216 upwardly protruding perpendicular thereto by a prescribed height from four corners thereof. The guide members 216 may have a polygonal column shape. The guide members 216 may be inserted into, or fastened or coupled to lower guide grooves 148 of the housing 140 that will be described below. As such, when the housing 140 is seated or disposed on the top of the base 210, the guide members 216 and the lower guide grooves 148 may guide a coupling position of the housing 140 onto the base 210 and, simultaneously, prevent the housing 140 from deviating from an installation target reference position due to, for example, vibration during operation of the lens moving apparatus 100 or due to worker mistakes during coupling.

As exemplarily illustrated in FIGS. 4 to 9, the housing 140 may generally have an opening and a hollow column shape (for example, a hollow square column shape) as illustrated in FIGS. 4 to 9. The housing 140 is configured to support at least two driving magnets 130 and the printed circuit board 170. The bobbin 110 is received in the housing 140 so as to be movable in the first direction relative to the housing 140.

The housing 140 has four flat side surfaces 141. Each side surface 141 of the housing 140 may have an area equal to or greater than the area of a corresponding one of the driving magnets 130.

As exemplarily illustrated in FIG. 9, among the four side surfaces 141 of the housing 140, two side surfaces facing each other are provided respectively with magnet penetration apertures 141a or recesses in which the driving magnets 130 are seated, placed, or fixed. The magnet penetration apertures 141a or recesses may have a size and shape corresponding to the driving magnets 130 and may have any other shapes to implement a guide function. A first driving magnet 131 and a second driving magnet 132, i.e. two driving magnets 130 may be mounted respectively to the magnet penetration apertures 141a.

In addition, among the four side surfaces 141 of the housing 140, one side surface perpendicular to the above-described two side surfaces or either surface except for the above-described two side surfaces may be provided with a sensor penetration aperture 141b in which a position sensor 180 as described below is inserted, placed, fixed, or seated. The sensor penetration aperture 141b may have a size and shape corresponding to the position sensor 180 as described below. In addition, the side surface provided with the sensor penetration aperture 141b is further provided with at least one mounting protrusion 149 to assist mounting, placement, provisional fixing, or complete fixing of the printed circuit board 170. The mounting protrusion 149 is configured to be inserted into a mounting aperture 173 formed in the printed circuit board 170 as described below. At this time, although the mounting aperture 173 and the mounting protrusion 149 may be coupled to each other in a shape-fit manner or an interference-fit manner, the mounting aperture 173 and the mounting protrusion 149 may simply implement a guide function.

Here, the other side surface opposite to the above-described side surface among the four side surfaces 141 of the housing 140 may be a flat solid surface, without being limited thereto.

In an additional embodiment of the housing 140, among the four side surfaces 141 of the housing 140, both side surfaces facing each other are provided with first and second magnet penetration apertures 141a and 141a' in which the driving magnets 130 are seated, placed, or fixed. In addition, among the four side surfaces 141 of the housing 140, one side surface perpendicular to the above-described two side surfaces or either surface except for the above-described two side surfaces may be provided with a third magnet penetration aperture and a sensor penetration aperture 141b spaced apart from the third magnet penetration aperture by a prescribed distance. Moreover, among the four side surfaces 141 of the housing 140, the other side surface facing the above-described side surface provided with the third magnet penetration aperture may be provided with a fourth magnet penetration aperture.

That is, the four side surfaces 141 of the housing 140 are provided with the four magnet penetration apertures and the single sensor penetration aperture 141b.

At this time, the first magnet penetration aperture 141a and the second magnet penetration aperture 141a' have the same size and the same shape and also have (almost) the same lateral length throughout the lateral length of the side surfaces of the housing 140. On the other hand, the third magnet penetration aperture and the fourth magnet penetration aperture may have the same size and the same shape and may also have a smaller lateral length than the first magnet penetration aperture 141a and the second magnet penetration aperture 141a'. This serves to attain a space for the sensor penetration aperture 141b because the side surface provided with the third magnet penetration aperture must be provided with the sensor penetration aperture 141b.

It will be naturally appreciated that the first driving magnet 131 to the fourth driving magnet are respectively seated, placed, or fixed in the first magnet penetration aperture to the fourth magnet penetration aperture. At this time, likewise, the first driving magnet 131 and the second driving magnet 132 have the same size and the same shape and also have almost the same lateral length throughout the lateral length of the side surfaces of the housing 140. In addition, the third driving magnet and the fourth driving magnet may have the same size and the same shape and may also have a smaller lateral length than the first driving magnet 131 and the second driving magnet 132.

Here, the third magnet penetration aperture and the fourth magnet penetration aperture may be symmetrically arranged on a line on the basis of the center of the housing 140. That is, the third driving magnet 130 and the fourth driving magnet 130 may be symmetrically arranged on a line on the basis of the center of the housing 140. In the case where the third driving magnet 130 and the fourth driving magnet 130 are arranged opposite each other to deviate to one side regardless of the center of the housing 140, electromagnetic force deviated to one side may be applied to the coil 120 of the bobbin 110 and, therefore, tilting of the bobbin 110 is possible. In other words, as the third driving magnet 130 and the fourth driving magnet 130 are symmetrically arranged on a line on the basis of the center of the housing 140, electromagnetic force may be applied to the bobbin 110 and the coil 120 without deviation, which ensures easy and accurate guidance of the bobbin 110 in the first direction.

In addition, as exemplarily illustrated in FIGS. 3 to 6 and FIG. 8, a plurality of first stoppers 143 may protrude from an upper surface of the housing 140. The first stoppers 143 serve to prevent collision between the cover member 300 and a body of the housing 140 and may prevent the upper surface of the housing 140 from directly colliding with an inner ceiling surface of the cover member 300 upon generation of an external shock. In addition, the first stoppers 143 may serve to guide an installation position of the upper elastic member 150. To this end, as exemplarily illustrated in FIG. 9, the upper elastic member 150 may be provided at positions corresponding to the first stoppers 143 with guide grooves 155 having a shape corresponding to the shape of the first stoppers 143.

In addition, a plurality of upper frame support bosses 144 may protrude from the top of the housing 140 so as to be coupled to an outer frame 152 of the upper elastic member 150. As will be described below, the outer frame 152 of the upper elastic member 150 corresponding to the upper frame support bosses 144 may be formed with first through-holes 152a or recesses having a shape corresponding to the shape of the upper frame support bosses 144. The upper frame support bosses 144 may be fixed to the first through-holes 152a or recesses using an adhesive or via fusion. The fusion may be, for example, thermal fusion or ultrasonic fusion.

In addition, as exemplarily illustrated in FIG. 7, a plurality of lower frame support bosses 147 may protrude from the bottom of the housing 140 so as to be coupled to outer frames 162 of the lower elastic member 160. The outer frames 162 of the lower elastic member 160 corresponding to the lower frame support bosses 147 may be formed with insertion recesses 162a or holes having a shape corresponding to the shape of the lower frame support bosses 147. The lower frame support bosses 147 may be fixed to the insertion recesses 162a or holes using an adhesive or via fusion. The fusion may be, for example, thermal fusion or ultrasonic fusion.

Although the driving magnet 130 may be fixed to the magnet penetration aperture 141a using an adhesive, the embodiment is not limited thereto and an adhesive member such as, for example, a double-sided tape may be used. In an alternative embodiment, instead of the magnet penetration aperture 141a, a recessed magnet seat may be formed in the inner surface of the housing 140. The magnet seat may have a size and shape corresponding to the size and shape of the driving magnet 130.

The driving magnets 130 may be installed at positions corresponding to the coil 120 wound around the bobbin 110. In addition, the driving magnets 130 may be configured into a unitary body. In the present embodiment, each driving magnet 130 may be oriented in such a way that one surface thereof facing the coil 120 wound around the bobbin 110 is an N-pole and an opposite outer surface thereof is an S-pole. However, the embodiment is not limited thereto and the driving magnet 130 may be oriented in the other way. In addition, the driving magnet 130 may be bisected into planes perpendicular to an optical axis.

The driving magnet 130 may be configured into a cuboid having a constant width and may be seated in the magnet penetration aperture 141a or recess such that a wide surface of the driving magnet 130 constitutes a portion of the side surface of the housing 140. At this time, the driving magnets 130 facing each other may be installed parallel to each other. In addition, the driving magnets 130 may be arranged to face the coil 120 of the bobbin 110. At this time, facing surfaces of the driving magnet 130 and the coil 120 of the bobbin 110 may be placed in parallel planes. However, the embodiment is not limited thereto. According to design, only one of the driving magnet 130 and the coil 120 of the bobbin 110 may be formed into a plane and the other one may be formed into a curved plane. Alternatively, both facing surfaces of the coil 120 of the bobbin 110 and the driving magnet 130 may be curved surfaces. At this time, the facing surfaces of the coil 120 of the bobbin 110 and the driving magnet 130 may have the same curvature.

As described above, the sensor penetration aperture 141b or recess is formed in one side surface of the housing 140, the position sensor 180 is inserted, placed, or seated in the sensor penetration aperture 141b, and the position sensor 180 is electrically coupled to one surface of the printed circuit board 170 via soldering. In other words, the printed circuit board 170 may be fixed to, supported by, or disposed at the exterior of the side surface provided with the sensor penetration aperture 141b or recess among the four side surfaces 141 of the housing 140.

The position sensor 180 may constitute the displacement sensing unit to determine a first displacement value in the first direction of the bobbin 110, along with a sensing magnet 190 of the bobbin 110 as described below. To this end, the position sensor 180 and the sensor penetration aperture 141b or recess are located at a position corresponding to the position of the sensing magnet 190.

The position sensor 180 may be a sensor that senses variation in magnetic force emitted from the sensing magnet 190 of the bobbin 110. In addition, the position sensor 180 may be a hall sensor. However, this is given by way of example and the present embodiment is not limited to the hall sensor. Any other sensors capable of sensing variation in magnetic force may be used and any other sensors capable of sensing positions other than magnetic force may be used. For example, a photo reflector may be used.

The printed circuit board 170 may be coupled to or disposed at one side surface of the housing 140 and may have the mounting aperture 173 or recess as described above. In this way, the installation position of the printed circuit board 170 may be guided by the mounting protrusion 149 formed at one side surface of the housing 140.

In addition, a plurality of terminals 171 may be arranged at the printed circuit board 170. The terminals 171 may receive external power and supply current to the coil 120 of the bobbin 110 and the position sensor 180. The number of the terminals 171 formed at the printed circuit board 170 may be reduced or increased according to the kinds of constituent elements that need to be controlled. According to the present embodiment, the printed circuit board 170 may be a flexible printed circuit board (FPCB).

The printed circuit board 170 may include a controller that readjusts the amount of current to be applied to the coil 120 based on the first displacement value sensed by the displacement sensing unit. That is, the controller is mounted on the printed circuit board 170. In another embodiment, the controller may be mounted on a separate substrate rather than being mounted on the printed circuit board 170. The separate substrate may be a substrate on which the image sensor of the camera module is mounted, or any one of other substrates.

An actuator driving distance may be additionally calibrated based on a hall voltage difference with respect to variation in magnetic flux (i.e. magnetic flux density) detected by the hall sensor.

The bobbin 110 is configured to reciprocate in a first axial direction relative to the housing 140 that is fixed in the first axial direction. Auto-focusing is implemented via movement of the bobbin 110 in the first axial direction.

The bobbin 110 will be described below in more detail with reference to the annexed drawings.

Meanwhile, the upper elastic member 150 and the lower elastic member 160 may elastically support upward movement and/or downward movement of the bobbin 110 in the optical axis direction. The upper elastic member 150 and the lower elastic member 160 may be leaf springs.

As exemplarily illustrated in FIGS. 2 to 4 and FIGS. 9 and 10, the upper elastic member 150 and the lower elastic member 160 may respectively include inner frames 151 and 161 coupled to the bobbin 110, outer frames 152 and 162 coupled to the housing 140, and connectors 153 and 163 connecting the inner frames 151 and 161 and the outer frames 152 and 162 to each other.

The connectors 153 and 163 may be bent at least one time to define a given pattern shape. Through position variation and fine deformation of the connectors 153 and 163, upward movement and/or downward movement of the bobbin 110 in the optical axis direction, i.e. in the first direction may be flexibly (or elastically) supported.

According to the present embodiment, as exemplarily illustrated in FIG. 9, the upper elastic member 150 has the first through-holes 152a formed in the outer frame 152 and a plurality of second through-holes 151a formed in the inner frame 151.

The first through-holes 152a may be engaged with the upper frame support bosses 144 formed at the upper surface of the housing 140, and the second through-holes 151a or recesses may be engaged with upper support bosses formed at an upper surface of the bobbin 110 as described below. That is, the outer frame 152 is fixed and coupled to the housing 140 using the first through-holes 152a and the inner frame 151 is fixed and coupled to the bobbin 110 using the second through-holes 151a or recesses.

The connectors 153 connect the inner frame 151 and the outer frame 152 to each other such that the inner frame 151 is elastically deformable in the first direction relative to the outer frame 152 within a prescribed range.

At least one of the inner frame 151 and the outer frame 152 of the upper elastic member 150 may be provided with at least one terminal unit that is electrically connected to at least one of the coil 120 of the bobbin 110 and the printed circuit board 170.

As exemplarily illustrated in FIG. 10, the lower elastic member 160 may have the insertion recesses 162a or holes formed in the outer frames 162 and a plurality of third through-holes 161a or recesses formed in the inner frames 161.

The insertion recesses 162a or holes are engaged with the lower frame support bosses 147 formed at a lower surface of the housing 140, and the third through-holes 161a or recesses are engaged with lower support bosses 114 formed at a lower surface of the bobbin 110 as described below. That is, the outer frames 162 are fixed and coupled to the housing 140 using the insertion recesses 162a or holes and the inner frames 161 are fixed and coupled to the bobbin 110 using the third through-holes 161a or recesses.

The connectors 163 connect the inner frames 161 and the outer frames 162 to each other such that the inner frames 161 are elastically deformable in the first direction relative to the outer frames 162 within a prescribed range.

The lower elastic member 160, as exemplarily illustrated in FIG. 10, may include a first lower elastic member 160a and a second lower elastic member 160b separated from each other. Through this bisection configuration, the first lower elastic member 160a and the second lower elastic member 160b of the lower elastic member 160 may receive different polarities of power or different magnitudes of powers. That is, after the inner frames 161 and the outer frames 162 are coupled respectively to the bobbin 110 and the housing 140, solder balls are provided at both ends of the coil 120 wound around the bobbin 110 and at corresponding positions of the inner frames 161. By implementing current carrying connection, such as, for example, soldering, at the solder balls, the inner frames 161 and the outer frames 162 may receive different polarities of power or different magnitudes of powers. In addition, the first lower elastic member 160a may be electrically connected to one of the ends of the coil 120 and the second lower elastic member 160b may be electrically connected to the other end of the coil 120 so as to receive current and/or a voltage from an external source.

The upper elastic member 150, the lower elastic member 160, the bobbin 110, and the housing 140 may be assembled with one another via, for example, bonding using thermal fusion and/or an adhesive. At this time, according to an assembly sequence, thermal fusion fixing and adhesive bonding may be sequentially implemented to finish a fixing operation.

In an alternative embodiment, the upper elastic member 150 may have a bisection configuration and the lower elastic member 160 may have a unitary configuration.

At least one of the inner frames 161 and the outer frames 162 of the lower elastic member 160 may be provided with at least one terminal unit that is electrically connected to at least one of the coil 120 and the printed circuit board 170.

The damper serves as an alleviator that absorbs vibration in the optical axis direction generated during auto-focusing of the lens moving apparatus. The damper is located between a stationary body that is fixed at an original position without movement during auto-focusing of the lens moving apparatus and a movable body configured to move in the optical axis direction during auto-focusing of the lens moving apparatus. The stationary body may be, for example, a cover member, a housing, or a base and the movable body may be, for example, a bobbin or a lens.

Although will be described below, the damper may be located between the bobbin and the housing.

At this time, the bobbin and the housing include a damping connector to define a receiving space for receiving the damper or an attachment region for attachment of the damper. That is, the damping connector is composed of a portion of the bobbin and a portion of the housing.

The damper and the damping connector according to the present invention will be described below in more detail with reference to the annexed drawings.

FIG. 11 is a schematic perspective view illustrating the bobbin 110 according to the embodiment, FIG. 12 is a schematic bottom perspective view illustrating the bobbin 110 according to the embodiment, FIG. 13 is a schematic exploded perspective view illustrating the bobbin 110 according to the embodiment, FIG. 14 is a partially enlarged perspective view of FIG. 13, FIG. 15 is a partially enlarged bottom view of FIG. 13, FIG. 16 is a schematic partially enlarged perspective view illustrating a receiving recess 117 according to an embodiment, and FIG. 17 is a schematic longitudinal sectional view illustrating the bobbin 110 according to the embodiment.

As exemplarily illustrated in FIGS. 11 to 17, the bobbin 110 may be installed in an inner space of the housing 140 so as to reciprocate in the optical axis direction. The coil 120 as described below may be affixed to an outer circumferential surface of the bobbin 110 so as to electromagnetically interact with the driving magnets 130 of the housing 140. Thereby, the bobbin 110 may reciprocate in the first direction via electromagnetic interaction of the coil 120 and the driving magnets 130. In addition, the bobbin 110 may be flexibly (or elastically) supported by the upper elastic member 150 and the lower elastic member 160 and moved in the first direction as the optical axis direction so as to perform auto-focusing.

Although not illustrated, the bobbin 110 may include a lens barrel (not illustrated) in which at least one lens is received. However, the lens barrel is merely a constituent element and may not be an essential constituent element of the lens moving apparatus. The lens barrel may be coupled inside the bobbin 110 in various manners. For example, female screw-threads may be formed at an inner circumferential surface of the bobbin 110 and male screw-threads corresponding to the female screw-threads may be formed at an outer circumferential surface of the lens barrel such that the lens barrel may be fastened to the bobbin 110 via screwing. However, the embodiment is not limited thereto and, instead of forming screw-threads at the inner circumferential surface of the bobbin 110, the lens barrel may be directly fixed inside the bobbin 110 via various other methods except for screwing. Alternatively, one sheet of lens may be integrally formed with the bobbin 110 without the lens barrel. The lens coupled to the lens barrel may be one sheet of lens, or two or more lenses may compose an optical system.

In addition, a plurality of upper support bosses 113 and a plurality of lower support bosses 114 may protrude from the upper surface and the lower surface of the bobbin 110.

The upper support bosses 113, as exemplarily illustrated in FIG. 11, may have a cylindrical shape or a prism shape and serve to couple and fix the inner frame 151 of the upper elastic member 150 to the bobbin 110. According to the present embodiment, the inner frame 151 of the upper elastic member 150 may be formed with the second through-holes 151a or recesses at positions corresponding to the upper support bosses 113. At this time, the upper support bosses 113 and the second through-holes 151a or recesses may be fixed to each other via thermal fusion, or may be fixed to each other using an adhesive member such as, for example, epoxy. In addition, there may be provided a plurality of upper support bosses. At this time, the upper support bosses may be spaced apart from one another by an appropriate distance to prevent interference with nearby constituent elements. That is, the upper support bosses may be symmetrically arranged about the center of the bobbin 110 so as to be spaced apart from one another by a constant distance. Alternatively, the upper support bosses may be symmetrically arranged about a specific virtual line passing through the center of the bobbin 110, but may not be spaced apart from one another by a constant distance.

The lower support bosses 114, as exemplarily illustrated in FIG. 12, may have a cylindrical shape or a prism shape and serve to couple and fix the inner frame 161 of the lower elastic member 160 to the bobbin 110. According to the present embodiment, the inner frame 161 of the lower elastic member 160 may be formed with the third through-holes 161a or recesses at positions corresponding to the lower support bosses 114. At this time, the lower support bosses 114 and the third through-holes 161a or recesses may be fixed to each other via thermal fusion, or may be fixed to each other using an adhesive member such as, for example, epoxy. In addition, there may be provided a plurality of lower support bosses 114 as illustrated in FIG. 12. At this time, the lower support bosses 114 may be spaced apart from one another by an appropriate distance to prevent interference with nearby constituent elements. That is, the lower support bosses 114 may be symmetrically arranged about the center of the bobbin 110 so as to be spaced apart from one another by a constant distance.

In addition, the bobbin 110 is formed at the upper surface and the lower surface thereof with upper escape recesses 112 and lower escape recesses 118 at positions corresponding to the connectors 153 of the upper elastic member 150 and the connectors 163 of the lower elastic member 160.

Through provision of the upper escape recesses 112 and the lower escape recesses 118, when the bobbin 110 is moved in the first direction relative to the housing 140, there is no spatial interference between the connectors 153 and 163 and the bobbin 110 and the connectors 153 and 163 may be more easily elastically deformed. In addition, although the upper escape recesses may be located at corners of the housing 140 as in the embodiment, the upper escape recesses may be located at the side surfaces of the housing according to the shape and/or position of the connectors of the elastic member.

In addition, although the outer circumferential surface of the bobbin 110 may be provided with a coil seating recess 116 for installation of the coil 120, only a seating portion may be provided.

Although the coil 120 may take the form of a ring-shaped coil block inserted into and coupled to the outer circumferential surface, the coil seating recess 116, or the seating portion of the bobbin 110, the embodiment is not limited thereto and the coil 120 may be directly wound around the outer circumferential surface, the coil seating recess 116, or the seating portion of the bobbin 110.

According to the present embodiment, the coil 120 may have an approximately octagonal shape as exemplarily illustrated in FIG. 13. This shape corresponds to the shape of the outer circumferential surface of the bobbin 110 and the bobbin 110 may also have an octagonal shape. In addition, at least four sides of the coil 120 may be linear sides and corners connecting the linear sides may be rounded or linearly formed. At this time, the linear sides of the coil 120 may correspond to the driving magnets 130. In addition, surfaces of the driving magnets 130 corresponding to the coil 120 may have the same curvature as the coil 120. That is, when the coil 120 has a linear shape, the corresponding surfaces of the driving magnets 130 may be flat formed. When the coil 120 has a curved shape, the corresponding surfaces of the driving magnets 130 may be curved and have the same curvature. In addition, even if the coil 120 is curved, the corresponding surfaces of the driving magnets 130 may be flat surfaces, and vice versa.

The coil 120 serves to move the bobbin 110 in the optical axis direction so as to perform auto-focusing. The coil 120 may create electromagnetic force via electromagnetic interaction with the driving magnets 130 upon receiving current, and the created electromagnetic force may move the bobbin 110.

Meanwhile, the coil 120 may be configured to correspond to the driving magnets 130. When the driving magnets 130 are configured into a unitary body as illustrated such that the entire surfaces of the driving magnets 130 facing the coil 120 have the same polarity, the coil 120 may be configured such that surface portions thereof corresponding to the driving magnets 130 have the same polarity. On the other hand, although not illustrated, in the case where each driving magnet 130 is bisected into planes perpendicular to the optical axis such that a surface thereof facing the coil 120 is divided into two or more sections, the coil 120 may also be divided into a plurality of parts equal in number to the divided sections of the driving magnet 130.

The bobbin 110 includes the sensing magnet 190, which is included in the displacement sensing unit along with the position sensor 180 of the housing 140 as described above. The sensing magnet 190 is fixed or coupled to, or disposed at the bobbin 110. In this way, the sensing magnet 190 may be moved in the first direction by the same displacement as the bobbin 110 when the bobbin 110 is moved in the first direction. In addition, the sensing magnet 190 may be configured into a unitary body and disposed such that the top of the bobbin 110 is an N-pole and the bottom of the bobbin 110 is an S-pole. However, the embodiment is not limited thereto and the sensing magnet 190 may be configured in the other way. In addition, the sensing magnet 190 may be bisected into planes perpendicular to the optical axis.

Here, as exemplarily illustrated in FIGS. 13 to 17, the bobbin 110 may be provided at the outer circumferential surface thereof with the receiving recess 117 for receiving the sensing magnet 190.

The receiving recess 117 may be indented inward of the bobbin 110 from the outer circumferential surface of the bobbin 110 by a prescribed depth.

Specifically, the receiving recess 117 is formed in one side of the bobbin 110 such that at least a portion of the receiving recess 117 is located inside the coil 120. In addition, at least a portion of the receiving recess 117 may be indented inward of the bobbin 110 by a prescribed greater depth than a depth of the coil seating recess 116. As the receiving recess 117 is indented inward of the bobbin 110, the sensing magnet 190 may be received in the bobbin 110. As such, space utility of the bobbin 110 may be improved because it is unnecessary to provide a separate installation space for the sensing magnet 190.

In particular, the receiving recess 117 is located at a position corresponding to a position of the position sensor 180 of the housing 140 (or a position opposite to the position sensor 180). In this way, a distance between the sensing magnet 190 and the position sensor 180 includes a thickness of the coil 120 and a distance between the coil 120 and the position sensor 180 or a distance between the coil 120 and the sensing magnet 190 and may have a minimum value, which may enhance the magnetic force sensing precision of the position sensor 180.

The receiving recess 117 has an opening 119 formed in one of the lower surface and the upper surface of the bobbin 110 so as to communicate with the receiving recess 117. For example, as exemplarily illustrated in FIG. 17, a portion of the lower surface of the bobbin 110 may be open to form the opening 119 and the opening 119 may define an entrance of the receiving recess 117. The sensing magnet 190 may be inserted, placed, or fixed through the opening 119 and may be separated through the opening 119.

More specifically, as exemplarily illustrated in FIGS. 15 to 17, the receiving recess 117 may include an inner surface for supporting one surface of the sensing magnet 190 and an adhesion recess 117b inwardly indented from the inner surface by a prescribed depth so as to allow an adhesive to be injected thereinto.

The inner surface of the receiving recess 117 is an inwardly oriented surface toward the center of the bobbin 110. In the case where the sensing magnet 190 is shaped into a cuboid, a wide surface of the sensing magnet 190 comes into contact with or is seated on the inner surface of the receiving recess 117.

The adhesion recess 117b may be formed as a portion of the inner surface is more deeply indented inward of the bobbin 110 toward the center of the bobbin 110. The adhesion recess 117b may be formed from the opening 119 to an inner surface of the bobbin 110 that comes into contact with one surface of the sensing magnet 190, or on which one surface of the sensing magnet 190 is seated or disposed.

As exemplarily illustrated in FIG. 17, the adhesion recess 117b is provided with a first additional recess 117c and the first additional recess 117c is longer than the sensing magnet 190 in a vertical thickness direction of the bobbin 110. That is, the first additional recess 117c is an extension of the adhesion recess 117b that is more deeply indented than one inner surface of the bobbin 110 that comes into contact with a back surface of the sensing magnet 190, or on which a back surface of the sensing magnet 190 is seated or disposed. Through provision of the first additional recess 117c, when an adhesive is injected into the adhesion recess 117b through the opening 119, the adhesive begins to be charged into the first additional recess 117c to thereby be charged into the adhesion recess 117b. Therefore, it is possible to prevent the adhesive from overflowing the adhesion recess 117b and moving to the coil 120 along a gap between the sensing magnet 190 and the receiving recess 117, which may reduce the defect rate of the lens moving apparatus 100 during coupling of the sensing magnet 190.

In addition, the adhesion recess 117b is further provided with a second additional recess 117a having a prescribed depth in an inward direction from the opening 119 to the center of the bobbin 110. That is, the second additional recess 117a is more deeply formed in the vicinity of the opening 119 than the inner surface in an inward direction toward the center of the bobbin 110. The second additional recess 117a is in communication with the adhesion recess 117b. In other words, the second additional recess 117a is an extension of the adhesion recess 117b. Through provision of the second additional recess 117a, an adhesive may be injected into the adhesion recess 117b through the second additional recess 117a. Therefore, it is possible to prevent the adhesive from overflowing in the vicinity of the opening 119 and being adhered to other components of the bobbin 110 such as, for example, the coil 120, which may reduce the defect rate of the lens moving apparatus 100 during coupling of the sensing magnet 190.

In an alternative embodiment, the second additional recess 117a may be formed alone in the bobbin 110 without the adhesion recess 117b. In this case, the bobbin 110 and the sensing magnet 190 may be coupled and fixed to each other as an adhesive is injected into the second additional recess 117a.

The adhesion recess 117b may include at least one of the first additional recess 117c and the second additional recess 117a. That is, the adhesion recess 117b may include only the first additional recess 117c or only the second additional recess 117a.

In an alternative embodiment, a depth between the inner surface of the receiving recess, by which one surface (i.e. a wide surface) of the sensing magnet is supported, and an outer circumferential surface (i.e. a coil seating recess surface) of the receiving recess, around which the coil is wound, may be equal to or less than a thickness of the sensing magnet. In this way, the sensing magnet may be fixed in the receiving recess as the coil inwardly applies pressure thereto during winding thereof. In this case, the adhesive is unnecessary.

In an additional embodiment, although not illustrated in the drawings, the bobbin 110 may further include an additional receiving recess 117 formed in the outer circumferential surface thereof at an opposite position symmetrical to the receiving recess 117 about the center of the bobbin 110 and a weight balance member received in the additional receiving recess 117.

That is, the additional receiving recess 117 is formed in the outer circumferential surface of the bobbin 110 and extends in an inward direction of the bobbin 110 by a prescribed depth at an opposite position linearly symmetrical to the receiving recess 117 about the center of the bobbin 110. In addition, the weight balance member is fixed to and coupled in the additional receiving recess 117 and has the same weight as the sensing magnet 190.

Through provision of the additional receiving recess 117 and the weight balance member, horizontal weight unbalance of the bobbin 110 due to provision of the receiving recess 117 and the sensing magnet 190 may be compensated.

The additional receiving recess 117 may include at least one of the adhesion recess 117b, the first additional recess 117c and the second additional recess 117a.

FIG. 18 is a bottom view illustrating the bobbin 110 and the housing 140 according to the embodiment, FIG. 19 is a schematic longitudinal sectional view illustrating the bobbin, 110, the housing 140, and the cover member 300 according to one embodiment, FIG. 20 is a schematic longitudinal sectional view illustrating the bobbin 110, the housing 140, and the cover member 300 according to another embodiment, and FIG. 21 is a schematic longitudinal sectional illustrating the bobbin 110 and the cover member 300 according to a further embodiment.

As exemplarily illustrated in FIG. 18, dampers 410 are provided between the housing 140 and the bobbin 110. However, the present embodiment is not limited thereto and the dampers 410 may be provided between the moving body and the stationary body of the lens moving apparatus 100 according to the present embodiment as described above.

The dampers 410 serve to attenuate vibration in the first direction (i.e. the optical axis direction) via electromagnetic interaction between the driving magnets 130 and the coil 120.

The dampers 410 are located at both the bobbin 110 and the housing 140 to allow the bobbin 110 to be movable relative to the housing 140 in the first direction within a prescribed range.

To this end, the dampers 410 are formed of a photo-curable resin. Specifically, the dampers 410 may be formed of a UV-curable resin and, more particularly, may be formed of UV-curable silicon.

The dampers 410 are provided in a semi-cured gel state in order to allow the bobbin 110 to be movable in the optical axis direction within a prescribed range, rather than being completely secured to the housing 140.

Here, to implement semi-curing of the dampers 410, a space between the bobbin 110 and the housing 140 (i.e. a space in which the dampers 410 are accommodated) and the dampers 410 are exposed to light (or UV) for a given time.

In addition, the dampers 410 are provided at a plurality of positions between the housing 140 and the bobbin 110. In this case, the dampers 410 may be spaced apart from one another by the same angle in a circumferential direction of the housing 140 and the bobbin 110. This serves to uniformly absorb optical axis directional vibration around the bobbin 110 caused by movement of the bobbin 110 during auto-focusing of the lens moving apparatus 100, thereby preventing the optical axis directional vibration of the bobbin 110 from being concentrated in a lateral direction.

In the case where an even number of dampers 410 are provided, the dampers 410 may be arranged between the bobbin 110 and the housing 140 such that the dampers 410 of each pair are arranged opposite to each other.

The bobbin 110 and the housing 140 include damping connectors 420. In other words, each damping connector 420 is composed of a portion of the bobbin 110 and a portion of the housing 140.

The damping connectors 420 are configured to increase an attachment area of the dampers 410 in order to increase an attenuation area of the dampers 410.

In addition, the damping connectors 420 are configured to allow the dampers 410 to be safely received or fixed between the bobbin 110 and the housing 140. This is because the dampers 410 are in a liquid state or a semi-liquid state prior to undergoing a semi-curing process and, therefore, when the dampers 410 are introduced between the bobbin 110 and the housing 140, the dampers 410 have difficulty in remaining at a given position between the bobbin 110 and the housing 140.

Each damping connector 420 is configured such that a portion of the bobbin 110 and a portion of the housing 140 overlap each other within a prescribed spatial range in the plan view of the lens moving apparatus 100.

Specifically, the damping connector 420 includes a damping protrusion 421 formed at one of the bobbin 110 and the housing 140 and a damping receiving recess 423 formed in the other one.

That is, the damping protrusion 421 may be formed at the bobbin 110 and the damping receiving recess 423 may be formed in the housing 140. Alternatively, the damping protrusion 421 may be formed at the housing 140 and the damping receiving recess 423 may be formed in the bobbin 110.

Hereinafter, for clarity of description, the case where the damping protrusion 421 is formed at the bobbin 110 and the damping receiving recess 423 is formed in the housing 140 will be described.

A plurality of damping protrusions 421 is formed at one of the bobbin 110 and the housing 140 at positions facing the other one of the bobbin 110 and the housing 140. That is, assuming that the bobbin 110 and the housing 140 have surfaces facing each other and the facing surface of the bobbin 110 is a first facing surface P1 and the facing surface of the housing 140 is a second facing surface P2, the damping protrusions 421 are formed at the first facing surface P1 as exemplarily illustrated in FIGS. 18 to 21. Of course, in the case where the damping protrusions 421 are formed at the housing 140, the damping protrusions 421 may be formed at the second facing surface P2.

The damping protrusions 421 horizontally protrude from the first facing surface P1 of the bobbin 110 toward the housing 140 or the second facing surface P2 by a prescribed length. Each damping protrusion 421 may generally take the form of a plate.

The damping protrusions 421 have a prescribed thickness. The prescribed thickness of the damping protrusions 421 is less than a height of damping receiving recesses 423 as described below.

A plurality of damping receiving recesses 423 is formed in the second facing surface P2 of the housing 140 at positions corresponding to positions of the damping protrusions 421.

Each of the damping receiving recesses 423 is indented in the second facing surface P2 so as to receive a portion of the damping protrusion 421 and the damper 410. That is, the damping receiving recess 423 is indented in the second facing surface P2 of the housing 140 in an outward direction from the center of the housing 140.

In addition, the damping receiving recess 423 has a prescribed width (i.e. a horizontal left-and-right length) and a prescribed height (i.e. a vertical up-and-down length). At this time, the damping receiving recess 423 is configured such that a prescribed width of the damping receiving recess 423 is greater than a width of the damping protrusion 421 and a prescribed height of the damping receiving recess 423 is greater than a prescribed thickness of the damping protrusion 421.

Describing this differently, the damping receiving recess 423 and the damping protrusion 421 are formed respectively at the housing 140 and the bobbin 110 such that facing surfaces thereof are spaced apart from each other by a prescribed distance. The damper 410 is located, attached, or charged in a receiving space defined by the facing surfaces of the damping receiving recess 423 and the damping protrusion 421 which are spaced apart from each other by a prescribed distance.

The damping receiving recess 423 has a stepped portion 423a, which is delimited by the inner surface of the housing 140 at an upper portion or a lower portion of the housing 140. For example, in the case where the damping receiving recess 423 is formed in a lower portion of the housing 140, the stepped portion 423a is formed parallel to the lower surface of the housing 140 among the inner surface of the housing 140. For the same object, in the case where the damping receiving recess 423 is formed in an upper portion of the housing 140, the stepped portion 423a is formed parallel to the upper surface of the housing 140 among the inner surface of the housing 140. Owing to the stepped portion 423a, the damper 410 prior to a semi-curing process may remain at a given position in the damping receiving recess 423 of the housing 140 and, accordingly, an operator may stably maintain the damper 410 at a desired position, which may facilitate a final forming process, i.e. a semi-curing process of the damper 410.

The damper 410 is attached to or received in the damping receiving recess 423 so as to surround the entire outer surface of a portion of the damping protrusion 421 by a prescribed thickness. That is, the damper 410 is configured to surround upper and lower surfaces, a front surface and both lateral surfaces of a portion of the damping protrusion 421 received in the damping receiving recess 423, the stepped portion 423a and both lateral surfaces of the damping receiving recess 423, and a surface of the damping receiving recess 423 facing the front surface of the damping protrusion 421.

As exemplarily illustrated in FIG. 18, the dampers 410, the damping protrusions 421, and the damping receiving recesses 423 are located at corners of the facing surfaces of the bobbin 110 and the housing 140. In this case, the driving magnets 130 are seated, placed, or fixed at the second facing surface P2 of the housing 140. That is, the dampers 410, the damping protrusions 421, and the damping receiving recesses 423 are located at surface positions not overlapping with surface positions where the driving magnets 130 are seated.

FIGS. 19 to 21 illustrate various embodiments with regard to positions of the damper 410, the damping protrusion 421, and the damping receiving recess 423 formed at the bobbin 110 and the housing 140 based on heights thereof from corners of the facing surfaces of the bobbin 110 and the housing 140.

First, as exemplarily illustrated in FIG. 19, according to one embodiment, the damping protrusion 421 is formed at the lower portion of the bobbin 110 and the damping receiving recess 423 has a greater height than a height of the damping protrusion 421 from an open lower end of the housing 140 (i.e. a beginning portion of the damping receiving recess 423).

That is, the damping protrusion 421 and the damping receiving recess 423 are formed such that the stepped portion 423a of the damping receiving recess 423 is located higher than the upper surface of the damping protrusion 421 by a prescribed height.

When an assembly process of the lens moving apparatus 100 is completed in such a situation, the open lower end of the housing 140 and the damper 410 are hermetically sealed by the housing 140 and the upper surface of the base 210 coupled to the lower end of the bobbin 110. That is, the damper 410 is shield by the upper surface of the base 210 so as not to be outwardly exposed.

Accordingly, since a washing process of the lens moving apparatus 100 is implemented in a state in which the damper 410 is shield by the base 210 so as not to be outwardly exposed, the damper 410 may not be affected by a hydraulic pressure of washing liquid, which may surely prevent loss or destruction of the damper 410 due to the washing process of the lens moving apparatus 100.

In addition, as exemplarily illustrated in FIG. 20, according to another embodiment, the damping protrusion 421 is formed at the upper portion of the bobbin 110 and the damping receiving recess 423 has a less height than a height of the damping protrusion 421 from an open upper end of the housing 140 (i.e. a beginning portion of the damping receiving recess 423).

That is, the damping protrusion 421 and the damping receiving recess 423 are formed such that the stepped portion 423a of the damping receiving recess 423 is located lower than the lower surface of the damping protrusion 421 by a prescribed height.

When an assembly process of the lens moving apparatus 100 is completed in such a situation, the open upper end of the housing 140 and the damper 410 are hermetically sealed by the housing 140 and/or a top surface (i.e. an inner ceiling surface) of the cover member 300 coupled to the upper end of the bobbin 110. That is, the damper 410 is shield by the upper surface of the cover member 300 so as not to be outwardly exposed.

Accordingly, since a washing process of the lens moving apparatus 100 is implemented in a state in which the damper 410 is shield by the cover member 300 so as not to be outwardly exposed, the damper 410 may not be affected by a hydraulic pressure of washing liquid, which may surely prevent loss or destruction of the damper 410 due to the washing process of the lens moving apparatus 100.

In addition, as exemplarily illustrated in FIG. 21, according to another embodiment, the damping protrusion 421 is formed at the first facing surface P1 of the bobbin 110 at a middle height of the bobbin 110 and the damping receiving recess 423 has a greater height than a height of the damping protrusion 421 from the open lower end of the housing 140.

At this time, the driving coil 120 provided at the bobbin 110 may be wound at the upper and lower sides of the damping protrusion 421 so as to avoid the damping protrusion 421.

In this case, since the damper 410 is deeply located in the bobbin 110 and the housing 140 on the basis of the lower ends of the bobbin 110 and the housing 140, the damper 410 is substantially not affected by the hydraulic pressure of washing liquid even if a washing process of the lens moving apparatus 100 is implemented in a state in which the open lower end of the housing 140 and the damper 410 are not hermetically sealed by the base 210. That is, according to the present embodiment, there is no risk of destruction of the damper 410 even if the washing process is implemented prior to coupling the base 210 with the housing 140 and/or the bobbin 110.

Although not illustrated in the drawings, in an alternative embodiment, the damping protrusion 421 may be formed at the first facing surface P1 of the bobbin 110 at a middle height of the bobbin 110 and may have a lower height than a height of the damping protrusion 421 from the open upper end of the housing 140.

Even in this case, similar to the above-described embodiment, the damper 410 is substantially not affected by the hydraulic pressure of washing liquid even if a washing process of the lens moving apparatus 100 is implemented in a state in which the open upper end of the housing 140 and the damper 410 are not hermetically sealed by the cover member 300. That is, according to the present embodiment, there is no risk of destruction of the damper 410 even if the washing process is implemented prior to coupling the cover member 300 with the housing 140 and/or the bobbin 110.

FIG. 22 is a schematic bottom side view illustrating the bobbin 110 and the housing 140 according to an additional embodiment.

As exemplarily illustrated in FIG. 22, the damping protrusion 421 and the damping receiving recess 423 may be formed at the facing surfaces of the bobbin 110 and the housing 140, rather than being formed at corners of the facing surfaces of the bobbin 110 and the housing 140.

In this case, the driving magnets 130 are seated, placed, or fixed at corners of the second facing surface P2 of the housing 140. That is, the dampers 410, the damping protrusions 421 and the damping receiving recesses 423 are formed at surface positions not overlapping with surface positions where the driving magnets 130 are seated. However, the present embodiment is not limited to the above-described positions with respect to a positional relationship between the driving magnets 130 and the dampers 410.

In the case of the present embodiment, similar to the above description with reference to FIGS. 19 to 21, the dampers 410, the damping protrusions 421 and the damping receiving recesses 423 may be formed at the facing surfaces of the bobbin 110 and the housing 140 at various heights according to various embodiments.

Figure 23B:
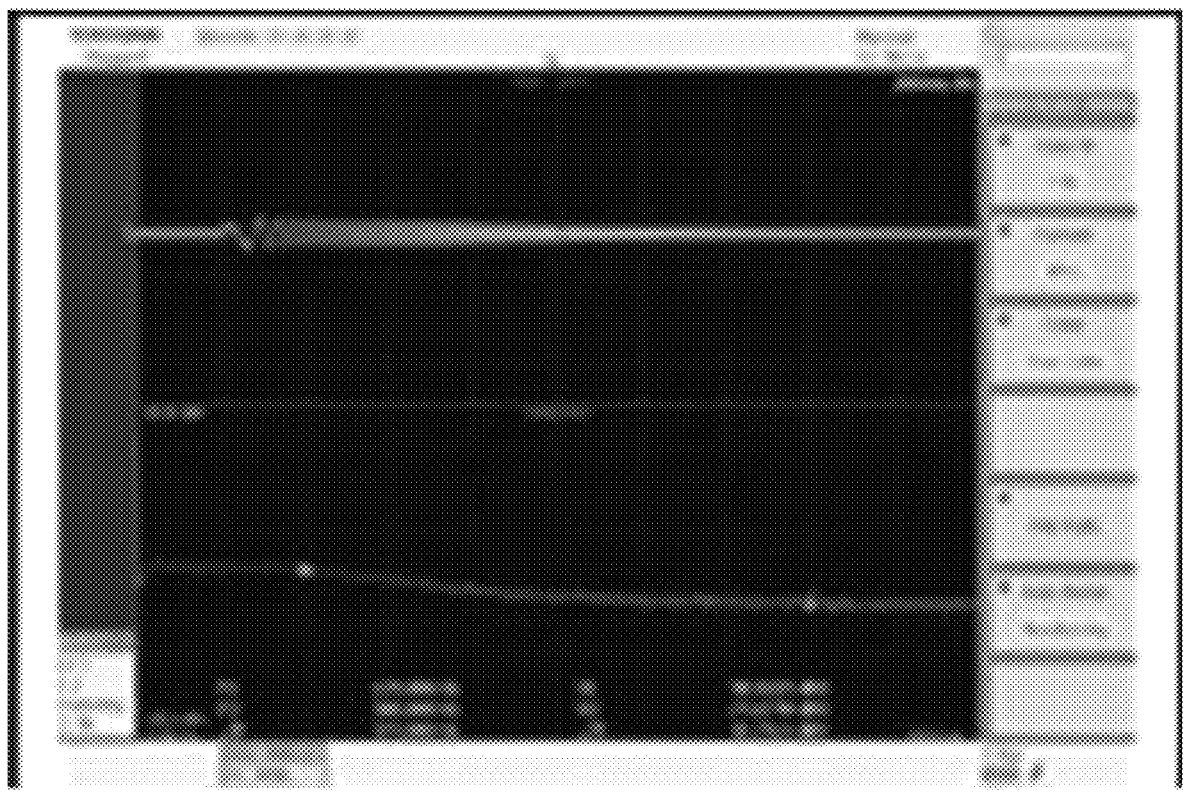
FIG. 23B is a graph illustrating optical axis directional vibration of a lens moving apparatus according to the present embodiment.
Figure 23C:
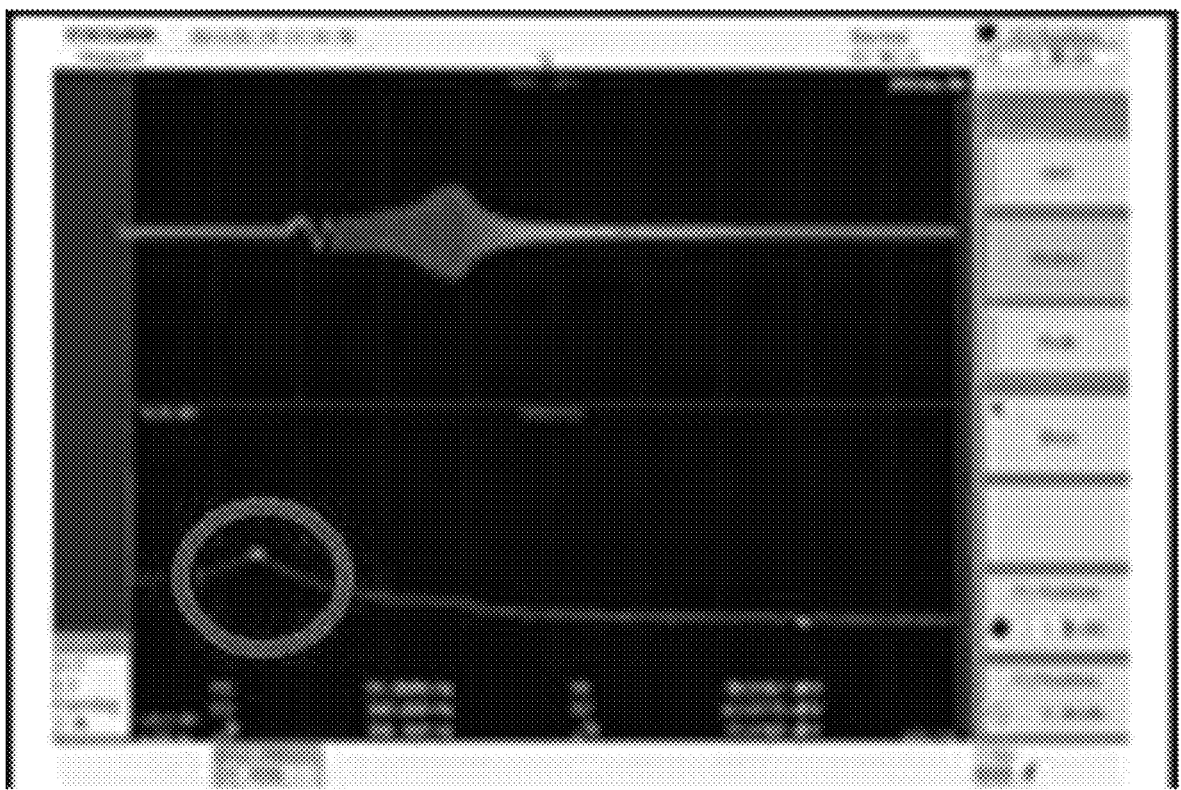
FIG. 23C is a graph illustrating optical axis directional vibration of the lens moving apparatus according to the present embodiment in the case where the damper is destroyed by a washing process for the lens moving apparatus.

FIG. 23A is a graph illustrating optical axis directional vibration of a conventional lens moving apparatus 100 having no damper 410, FIG. 23B is a graph illustrating optical axis directional vibration of the lens moving apparatus 100 according to the present embodiment, and FIG. 23C is a graph illustrating optical axis directional vibration of the lens moving apparatus 100 according to the present embodiment in the case where the dampers 410 are destroyed by a washing process of the lens moving apparatus 100.

In the case where the dampers 410 for auto-focusing of the lens moving apparatus 100 are not provided, as illustrated in the graph of a vibration experimental result during auto-focusing of the lens moving apparatus 100 illustrated in FIG. 23A, it can be confirmed that a resonance point or a resonance section (see a red circular mark) at which an amplitude is maximized is generated.

Differently, according to the present embodiment, in the case where the dampers 410 for auto-focusing of the lens moving apparatus 100 are provided, as illustrated in the graph of a vibration experimental result during auto-focusing of the lens moving apparatus 100 illustrated in FIG. 23B, it can be confirmed that the resonance point or the resonance section, illustrated in the graph of a vibration experimental result during auto-focusing of the lens moving apparatus 100 illustrated in FIG. 23A, is removed.

However, even in the case of the lens moving apparatus 100 having the dampers 410, destruction of a portion or the entirety of each damper 410 by the hydraulic pressure of washing liquid may frequently occur during the washing process. Thereby, as illustrated in the graph of a vibration experimental result during auto-focusing of the lens moving apparatus 100 illustrated in FIG. 23C, it can be confirmed that a resonance point or a resonance section (see a red circular mark) at which an amplitude is maximized is again generated.

In the present embodiment, in order to prevent generation of the resonance point or the resonance section due to loss or destruction of the dampers 410 caused by the washing process, as described above, the damping connectors 420 for safe reception, placement, or fixing of the damper 410 are provided and the dampers 410 and the damping connectors 420 are positioned such that the dampers 410 are hermetically sealed by the base 210 and/or the cover member 300 so as not to be outwardly exposed during the washing process.

As described above, in the present embodiment, the dampers are interposed between the bobbin and the housing, thereby attenuating optical axis directional vibration of the bobbin during implementation of auto-focusing. In this way, the present embodiment may prevent resonance of the lens moving apparatus in the optical axis direction during implementation of auto-focusing. As a result, the present embodiment may prevent damage or breakage of the upper elastic member and/or the lower elastic member which connect the bobbin and the housing to each other.

In addition, by providing the damping connectors to increase an attachment area of the dampers between the bobbin and the housing, the present embodiment may increase an attenuation area of the dampers, thereby more efficiently removing resonance during implementation of auto-focusing and improving attachment safety of the dampers between the bobbin and the housing.

In addition, by providing the dampers between the bobbin and the housing, the present embodiment may prevent the dampers from being outwardly exposed during the washing process of the assembled lens moving apparatus in the manufacture of the lens moving apparatus and, consequently, may prevent destruction of a portion or the entirety of each damper by the hydraulic pressure of washing liquid during the washing process.

In addition, a camera module may be constructed by coupling a lens to the lens moving apparatus and providing an image sensor and a printed circuit board on which the image sensor is disposed below the lens moving apparatus. The base of the lens moving apparatus and the printed circuit board on which the image sensor is disposed may be coupled to each other.

FIG. 24 is a schematic partially enlarged perspective view illustrating the damper 410 and the damping connector 420 according to one embodiment, FIG. 25 is a schematic partially enlarged plan view illustrating the damper 410 and the damping connector 420 according to the embodiment, and FIG. 26 is a schematic partially enlarged longitudinal sectional view illustrating the damper 410 and the damping connector 420 according to the embodiment taken along line A-A of FIG. 25.

The dampers 410 may be located at a plurality of positions between the inner frame 151 or 161 of at least one elastic member among the upper elastic member and the lower elastic member and the housing 140.

That is, as exemplarily illustrated in FIGS. 24 to 26, the dampers 410 may be located between the inner frame 151 of the upper elastic member and the housing 140. Alternatively, although not illustrated in the drawings, the dampers 410 may be located between the inner frame 161 of the lower elastic member and the housing 140. Alternatively, the dampers 410 may be located between the inner frame 151 of the upper elastic member and the housing 140 and between the inner frame 161 of the lower elastic member and the housing 140.

Hereinafter, in order to avoid repeated description, as illustrated in the drawings, the following description may be based on the case where the dampers 410 are located between the inner frame 151 of the upper elastic member and the housing 140.

The dampers 410 may serve to attenuate vibration in the first direction (i.e. the optical axis direction) via electromagnetic interaction between the driving magnets 130 and the coil 120.

The dampers 410 may be provided at the bobbin 110 and the housing 140 to allow the bobbin 110 to be movable relative to the housing 140 in the first direction within a prescribed range.

To this end, the dampers 410 may be formed of a photo-curable resin. Specifically, the dampers 410 may be formed of a UV-curable resin and, more particularly, may be formed of UV-curable silicon or damping silicon, or damping members.

The dampers 410 may be provided in a semi-cured gel state in order to allow the bobbin 110 to be movable in the optical axis direction within a prescribed range rather than being completely secured to the housing 140.

Here, to implement semi-curing of the dampers 410, a space between the inner frame 151 and the housing 140 (i.e. a space in which the dampers 410 are accommodated) and the dampers 410 are exposed to light (or UV) or heat for a given time.

In addition, the dampers 410 may be provided between the housing 140 and the inner frame 151. In this case, the dampers 410 may be spaced apart from one another by the same angle in a circumferential direction of the housing 140 and the inner frame 151. This serves to uniformly absorb optical axis directional vibration around the bobbin 110 caused by movement of the bobbin 110 during auto-focusing of the lens moving apparatus 100, thereby preventing the optical axis directional vibration of the bobbin 110 from being concentrated in a lateral direction.

In the case where an even number of dampers 410 are provided, the dampers 410 may be arranged between the inner frame 151 and the housing 140 so as to make a pair, or such that the dampers 410 of each pair face each other.

The inner frame 151 and the housing 140 may include the damping connectors 420. In other words, each damping connector 420 may be composed of a portion of the inner frame 151 and a portion of the housing 140.

The damping connectors 420 may delimit receiving spaces for the dampers 410. In addition, the damping connectors 420 may be configured to increase an attachment area of the dampers 410 in order to increase an attenuation area of the dampers 410.

In addition, the damping connectors 420 may be configured to allow the dampers 410 to be safely received or fixed between the inner frame 151 and the housing 140. This is because the dampers 410 are in a liquid state or a semi-liquid state prior to undergoing a semi-curing process and, therefore, when the dampers 410 are introduced between the inner frame 151 and the housing 140, the dampers 410 have difficulty in remaining at a given position between the inner frame 151 and the housing 140.

The damping connectors 420 may be configured such that a portion of the inner frame 151 and a portion of the housing 140 overlap each other within a prescribed spatial range in the plan view of the lens moving apparatus 100.

Specifically, each damping connector 420 includes a damping protrusion 421 formed at the inner frame 151 and a damping receiving recess 423 formed in the housing 140.

The damping protrusion 421 and the damping receiving recess 423 may be arranged to face each other between the inner frame 151 and the housing 140.

The damping protrusion 421 may be formed at a surface of the inner frame 151 facing the housing 140. Specifically, assuming that the inner frame 151 of the upper elastic member and the housing 140 have surfaces facing each other and, the facing surface of the inner frame 151 is a first facing surface and the facing surface of the housing 140 is a second facing surface, the damping protrusion 421 may horizontally extend in an outward direction (i.e. toward the inner surface of the housing 140) from the first facing surface by a prescribed length as exemplarily illustrated in FIGS. 24 to 27.

The damping protrusion 421 may generally take the form of a plate.

The damping protrusion 421 may have a prescribed thickness. The prescribed thickness of the damping protrusion 421 may be equal to a thickness of the upper elastic member.

In addition, the damping protrusion 421 may extend in the same horizontal plane as a horizontal plane of the upper elastic member.

A portion of the damping protrusion 421 may be located in the damping receiving recess 423. At this time, a lower surface of the portion of the damping protrusion 421 may be located higher than a bottom portion 423a of the damping receiving recess 423 by a prescribed height.

In addition, according to the present embodiment, the damping protrusion 421 may have at least one perforation 421a. The perforation 421a may be perforated in a thickness direction of the damping protrusion 421. Here, the perforation 421a may serve to increase an exposure area of a portion of the damper 410 located below the damping protrusion 421. Through provision of the perforation 421a, it is possible to considerably reduce a time required for a semi-curing process for making the damper 410 into a semi-cured get state and, consequently, to reduce the entire manufacture time of the lens moving apparatus.

At this time, according to the present embodiment, as exemplarily illustrated in FIG. 24, the perforation 421a may be incised to outwardly open a portion of a free end of the damping protrusion 421. At this time, preferably, the incised perforation 421a may have a semicircular shape. However, this is given by way of example and the present embodiment is not limited to this shape.

In addition, according to the present embodiment, the damping protrusion 421 may have lateral extensions 421b extending in opposite directions from a free end of the damping protrusion 421. The lateral extensions 421b may horizontally extend toward both side surfaces of the damping receiving recess 423.

At this time, the lateral extensions 421b may be arranged such that facing surfaces of the lateral extensions 421b and the damping receiving recess 423 or lateral partitions 430 as described below may be spaced apart from each other.

The outer frame 152 may have an outwardly bent portion or an outwardly incised portion 425 at a position corresponding to a position of the damping receiving recess 423. This serves to remove spatial interference between a portion of the damping protrusion 421 and the outer frame 152 since the damping protrusion 421 of the inner frame 151 and the outer frame 152 need to be located in the same horizontal plane and a portion of the damping protrusion 421 needs to be received in the damping receiving recess 423.

A plurality of damping receiving recess 423 may be formed in the second facing surface of the housing 140 at positions corresponding to positions of the damping protrusions 421.

Each damping receiving recess 423 may be indented in the second facing surface so as to receive a portion of the damping protrusion 421 and the damper 410. That is, the damping receiving recess 423 may be indented in the second facing surface of the housing 140 in an outward direction from the center of the housing 140.

Through provision of the damping receiving recess 423 as described above, when charging the damper 410 in a liquid state prior to undergoing a semi-curing process into between the inner frame 151 and the housing 140, it is possible to stabilize a position of the damper 140 and to adjust the amount of a material used as the damper 410 so as to correspond to a volume of the damping receiving recess 423, which may minimize the amount of the material used as the damper 410.

In addition, the damping receiving recess 423 has a prescribed width (i.e. a horizontal left-and-right length) and a prescribed height or depth (i.e. a vertical up-and-down length). At this time, the damping receiving recess 423 is configured such that a prescribed width of the damping receiving recess 423 is greater than a width of the damping protrusion 421 and a prescribed height of the damping receiving recess 423 is greater than a prescribed thickness of the damping protrusion 421.

That is, the damping receiving recess 423 may be formed in the housing 140 at a position corresponding to a position of the damping protrusion 421 by a prescribed depth from the upper surface of the housing 140.

Describing this differently, the damping receiving recess 423 and the damping protrusion 421 are formed at the upper elastic member and the housing 140 such that the facing surfaces of the upper elastic member and the housing 140 are spaced apart from each other by a prescribed distance. The damper 410 is located, attached, or charged in a receiving space defined by the facing surfaces of the upper elastic member and the housing 140 which spaced apart from each other by a prescribed distance.

The damping receiving recess 423 may have the bottom portion 423a defined by the inner surface of the housing 140. For example, in the case where the damping receiving recess 423 is formed in a lower portion of the housing 140, the bottom portion 423a may be formed parallel to the lower surface of the housing 140 among the inner surface of the housing 140. For the same object, in the case where the damping receiving recess 423 is formed in an upper portion of the housing 140, the bottom portion 423a may be formed parallel to the upper surface of the housing 140 among the inner surface of the housing 140. Owing to the bottom portion 423a, the damper 410 prior to a semi-curing process may remain at a given position in the damping receiving recess 423 of the housing 140 and, accordingly, an operator may stably maintain the damper 410 at a desired position, which may facilitate a final forming process, i.e. a semi-curing process of the damper 410.

Here, according to the present embodiment, as exemplarily illustrated in FIG. 24, the bottom portion 423a of the damping receiving recess 423 may be downwardly inclined. At this time, both sides of the bottom portion 423a may be concavely inclined at an even angle about the center axis of the stepped portion 423a as the lowermost point. With this shape, when the damper 410 is charged or introduced into the damping receiving recess 423, a sufficient amount of the damper 410 may be charged in a region below the center of the damping protrusion 421 where concentrative attenuation is required and, simultaneously, the damper 410 may be more stably maintained at a given position even if it does not yet undergo a semi-curing process. In addition, as described above, the perforation 421*a* may be formed in the free end of the damping protrusion 421. As such, even if the amount of the damper 410 below the perforation 421*a* (i.e. above the center axis of the damping receiving recess 423) is increased, the damper 410 may be exposed to light through the perforation 421*a*, which ensures uniform semi-curing of the entire damper 410.

In addition, the damper 410 may be attached to or received in the damping receiving recess 423 so as to surround the entire outer surface of a portion of the damping protrusion 421 by a prescribed thickness. That is, the damper 410 may be configured to surround upper and lower surfaces, a front surface and both lateral surfaces of a portion of the damping protrusion 421 received in the damping receiving recess 423, the bottom portion 423*a* and both lateral surfaces of the damping receiving recess 423, and a surface of the damping receiving recess 423 facing the front surface of the damping protrusion 421.

In addition, the housing 140 may include lateral partitions 430 formed at both lateral sides of the damping receiving recess 423 so as to protrude orthogonally from the upper surface of the housing 140. Through provision of the lateral partitions 430, when the damper 410 is introduced or charged into the damping receiving recess 423, it is possible to prevent the damper 410 from overflowing both the lateral sides of the damping receiving recess 423 and moving to other components in the lens moving apparatus 100.

Hereinafter, additional embodiments with respect to various shapes of the damping protrusion 421 will be described in detail.

FIG. 27 is a schematic partially enlarged plan view illustrating the damping protrusion 421 according to a first additional embodiment, FIG. 28 is a schematic partially enlarged plan view illustrating the damping protrusion 421 according to a second additional embodiment, FIG. 29 is a schematic partially enlarged plan view illustrating the damping protrusion 421 according to a third additional embodiment, and FIG. 30 is a schematic partially enlarged plan view illustrating the damping protrusion 421 according to a fourth additional embodiment.

The perforation 421*a* and the lateral extensions 421*b* as described above will be used below respectively as terms designating the corresponding components.

As exemplarily illustrated in FIG. 27, according to a first additional embodiment, the damping protrusion 421 may include lateral extensions 421*b* extending in opposite directions from the free end thereof and a single perforation 421*a*.

Here, the perforation 421*a* may take the form of a closed perforation formed in the damping protrusion 421. For example, the perforation 421*a* may be a circular perforation formed in the damping protrusion 421.

As exemplarily illustrated in FIG. 28, according to a second additional embodiment, the damping protrusion 421 may include lateral extensions 421*b* extending in opposite directions from the free end thereof and a plurality of perforations 421*a*.

Here, the perforations 421*a* may have a smaller diameter than the perforation 421*a* according to the first additional embodiment and may be formed at a plurality of positions in the damping protrusion 421. In addition, the perforations 421*a* may take the form of closed perforations formed in the damping protrusion 421. For example, the perforations 421*a* may be circular perforations formed in the damping protrusion 421.

With this configuration according to the second additional embodiment, an exposure area of a portion of the damper 410 located below the damping protrusion 421 may be increased, which may result in considerable reduction in exposure time required for a semi-curing process of the damper 410.

In an alternative embodiment, some of the perforations 421*a* may be circular perforations formed in the damping protrusion 421 and some of the perforations 421*a* may be a semicircular perforation formed in the free end of the damping protrusion 421.

In addition, each of the lateral extensions 421*b* may have at least one perforation 421*a*. In this way, an exposure area of a portion of the damper 410 located below the damping protrusion 421 may be further increased.

Of course, the perforation 421*a* formed in the lateral extension 421*b* may be additionally formed in the damping protrusion 421 as illustrated in FIGS. 30 and 31.

As exemplarily illustrated in FIGS. 29 and 30, according to a third additional embodiment and a fourth additional embodiment, the damping protrusion 421 may have a single perforation 421*a*. At this time, in the present embodiments, the damping protrusion 421 does not include the lateral extensions 421*b*.

In addition, the perforation 421*a* according to the third additional embodiment as illustrated in FIG. 29 may be a closed perforation formed in the damping protrusion 421. At this time, the closed perforation may have a circular shape.

The perforation 421*a* according to the fourth additional embodiment as illustrated in FIG. 30 may be formed by incising a portion of the free end of the damping protrusion 421 so as to be outwardly opened. At this time, the incised perforation may have a semicircular shape.

FIG. 31 is a schematic longitudinal sectional view illustrating the damping receiving recess 423 according to an additional embodiment.

The damping receiving recess 423 according to the embodiment as illustrated in FIG. 31 may include all of the constituent elements and technical features of the damping receiving recess 423 according to the above-described embodiments.

As exemplarily illustrated in FIG. 31, the damping receiving recess 423 according to the present embodiment may include an inner partition 423*c* formed near the second facing surface so as to vertically protrude from the bottom portion 423*a* of the damping receiving recess 423 by a prescribed height.

At this time, the prescribed height of the inner partition 423*c* may be smaller than a height between the lower surface of the damping protrusion 421 and the bottom portion 423*a*. This serves to remove spatial interference between the damping protrusion 421 and the inner partition 423*c* via elastic reciprocation of the bobbin 110 in the first direction because the bobbin 110 elastically reciprocates in the first direction while the lens moving apparatus 100 performs auto-focusing.

That is, the damping receiving recess 423 may be defined by the bottom portion 423*a*, the lateral partitions 430 formed at both lateral sides thereof, the inner surface of the housing 140, and the inner partition 423*c*.

Through provision of the inner partition 423*c*, when the damper 410 is introduced or charged into the damping receiving recess 423, it is possible to prevent the damper 410 from overflowing inward of the damping receiving recess 423 (i.e. toward the bobbin 110) and moving to other components in the lens moving apparatus 100 and to more stably fix and maintain the damper 410 in position.

FIG. 32 is a schematic plan view and a partially enlarged view illustrating the damper 410 and the damping connector 420 according to another embodiment.

The damper 410 and the damping connector 420 according to the embodiment of FIG. 32 may include all of components and technical features of the damper 410 and the damping connector 420 according to the above-described embodiments except for differences in terms of positions thereof.

As exemplarily illustrated in FIG. 32, the damper 410 according to the present embodiment may be located between the connector 153 or 163 of at least one electric member among the upper elastic member and the lower elastic member and the housing 140.

Specifically, the connector 153 or 163 may be bent at least one time between the inner frame 151 or 161 and the outer frame 152 or 162 into a given shape of pattern so as to be elastically deformable in the first direction. The connector may schematically or wholly have a shape in which an "S"-shaped portion is repeated one or more times.

According to the present embodiment, the damping connectors 420 may be provided at positions corresponding to positions of the dampers 410. Each damping connector 420 may be composed of a portion of the connector of the upper elastic member and a portion of the housing 140.

Specifically, the damping protrusion 421 may extend from the outer surface of the connector 153 having a given pattern toward the housing 140. That is, the damping protrusion 421 may horizontally extend in an outward direction (i.e. toward the housing 140) from the outer surface of the outermost bent portion of the connector 153 that is bent one or more times into a given shape of pattern.

The damping receiving recess 423 may be located at a position corresponding to the damping protrusion 421. That is, the damping receiving recess 423 may be located at the housing 140 so as to face the damping protrusion 421.

The damping receiving recess 423 may be indented so as to receive a portion of the damping protrusion 421 and the damper 410.

The damping protrusion 421 and the damping receiving recess 423 according to the present embodiment may include all of constituent elements and technical features of the damping protrusion 421 and the damping receiving recess 423 according to the above-described embodiments with reference to FIGS. 30 and 31.

Figure 33A:
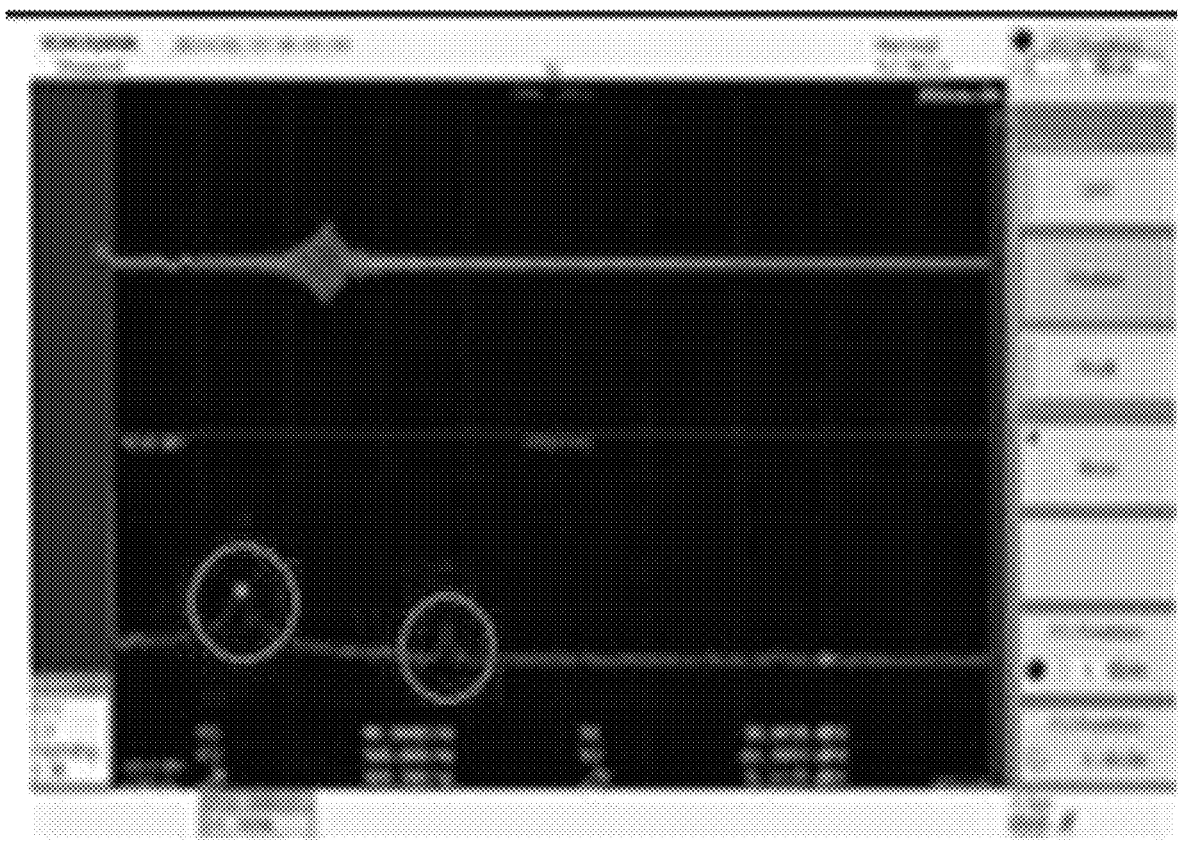
FIG. 33A is a graph illustrating optical axis directional vibration of the conventional lens moving apparatus having no damper.
Figure 33B:
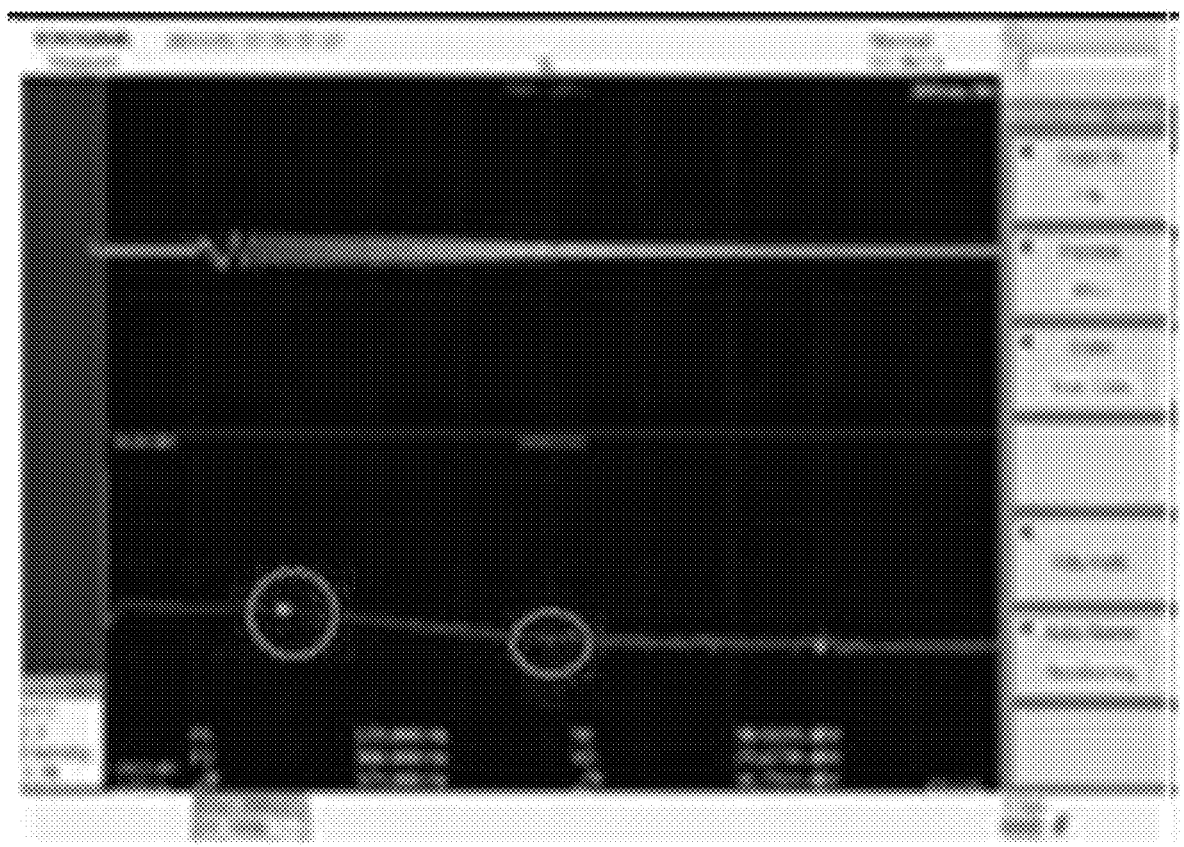
FIG. 33B is a graph illustrating optical axis directional vibration of the lens moving apparatus according to the present embodiment.

FIG. 33A is a graph illustrating optical axis directional vibration of the conventional lens moving apparatus having no damper 410, and FIG. 33B is a graph illustrating optical axis directional vibration of the lens moving apparatus according to the present embodiment.

In the case of the conventional lens moving apparatus 100 having no damper 410 for auto-focusing, as illustrated in the graph of a vibration experiment result during auto-focusing of the lens moving apparatus 100 illustrated in FIG. 33A, it can be confirmed that a resonance point or a resonance section (see a red circular mark) at which an amplitude is maximized is generated.

Differently, according to the present embodiment, in the case where the damper 410 for auto-focusing of the lens moving apparatus 100 is provided, as illustrated in the graph of a vibration experimental result during auto-focusing of the lens moving apparatus 100 illustrated in FIG. 33B, it can be confirmed that the resonance point or the resonance section, illustrated in the graph of a vibration experimental result during auto-focusing of the lens moving apparatus 100 illustrated in FIG. 33A, is removed.

As described above, the present embodiment may attenuate optical axis directional vibration of the bobbin during implementation of auto-focusing by providing the damper between at least one elastic member among the upper elastic member and the lower elastic member and the housing. In this way, the present embodiment may remove resonance of the lens moving apparatus in the optical axis direction during implementation of auto-focusing. As a result, the present embodiment may prevent damage and breakage of the upper elastic member and/or the lower elastic member that connect the bobbin and the housing to each other.

In addition, through provision of the damping connectors between the bobbin and the housing to increase an attachment area of the dampers, the present embodiment may increase an attenuation area of the dampers and, consequently, may more efficiently remove resonance during implementation of auto-focusing and improve attachment stability of the dampers between the bobbin and the housing.

In addition, the camera module may further include a camera module controller. The camera module controller may compare a focal distance of a lens depending on a distance between an imaging target object and the lens with a first displacement value calculated based on a current variation sensed by the displacement sensor. Thereafter, when the first displacement value or a current position of the lens does not correspond to the focal distance of the lens, the camera module controller may reregulate the amount of current applied to the coil 120 of the bobbin 110 to move the bobbin 110 in the first direction by a second displacement. In the displacement sensor, as the sensing magnet 190 fixedly coupled to the bobbin 110 as a moving body is moved in the first direction, the position sensor 180 fixedly coupled to the housing 140 as a stationary element senses variation in magnetic force emitted from the sensing magnet 190. Based on variation in the amount of current output according to the sensed variation in magnetic force, the displacement sensor, a separate driver IC or the camera module controller may calculate or judge a current position of the bobbin 110 or the first displacement. As the current position of the bobbin 110 or the first displacement calculated or judged by the displacement sensor is transmitted to the controller of the printed circuit board 170, the controller may again determine a position of the bobbin 110 for auto-focusing and adjust the amount of current to be applied to the coil 120.

Second Embodiment

FIG. 34 is an exploded perspective view illustrating a lens moving apparatus according to another embodiment, FIG. 35 is a perspective view illustrating the lens moving apparatus having no cover member according to the embodiment, FIG. 36 is a view illustrating a housing and an upper elastic member according to the embodiment, FIG. 37 is a side sectional view of FIG. 36, and FIG. 38 is a view illustrating graphic curves acquired during movement of the conventional lens moving apparatus and the lens moving apparatus according to the embodiment.

Referring to FIGS. 34 to 37, the lens moving apparatus according to the present embodiment may basically include a moving unit 100, a stationary unit 200, an elastic unit 300, a damper member 400, and a position sensing unit 500.

The moving unit 100 may accommodate a lens or a lens unit 10 as described below and is movable. The moving unit 100 may include a bobbin 110 and a coil unit 120. The lens unit 10 may be accommodated in the bobbin 110.

Specifically, the bobbin 110 may be coupled to the lens unit 10 as described below so as to fix the lens unit 10. Although the lens unit 10 and the bobbin 110 may be coupled to each other via screwing of threads formed at an inner circumferential surface of the bobbin 110 and an outer circumferential surface of the lens unit 10, the lens unit 10 and the bobbin 110 may be coupled to each other in a non-screwing manner using an adhesive. Of course, the lens unit 10 and the bobbin 110 may be more firmly coupled to each other by being screwed and attached to each other using an adhesive.

In addition, the outer circumferential surface of the bobbin 110 may be provided with a stepped portion 111 to guide winding or installation of the coil unit 120 as described below. The stepped portion 111 may be continuously formed at the outer circumferential surface of the bobbin 110, or may be formed at the center of each side surface of the bobbin 110 as illustrated. Alternatively, the stepped portion may be configured to support the coil unit so as to allow a prefabricated coil winding to be fitted around an upper portion or a lower portion of the outer circumferential surface of the bobbin 110.

In addition, the bobbin 110 may be provided at an upper surface and/or a lower surface thereof with one or more coupling bosses 112 for coupling of an upper elastic member 310 and/or a lower elastic member 320. The upper elastic member 310 and/or the lower elastic member 320 serve to support the bobbin 110 at the upper side of a base 240 as described below.

The bobbin 110 may have a first recess 113 indented in the side surface thereof or defined by the stepped portion 111. A sensing magnet 510 as described below is located in the first recess 113. In addition, the bobbin 110 may be provided at the upper surface thereof with one or more protrusions 114 formed in the proximity of connectors 310*c* of the upper elastic member 310 as described above. In a plan view, the protrusions 114 may have a rectangular, triangular, circular, or trapezoidal shape, without being limited thereto.

The first coupling bosses 112 or the protrusions 114 may be equidistantly or symmetrically formed at the upper surface of the bobbin 110. In the present embodiment, four pairs of the coupling bosses 112 (each pair including two coupling bosses 112) may be formed and four protrusions 114 may be equidistantly or symmetrically formed.

The coil unit 120 may be located around the bobbin 110. Specifically, the coil unit 120 may be wound around the outer circumferential surface of the bobbin 110 under guiding of the stepped portion 111 of the bobbin 110. The coil unit 120 as a prefabricated coil winding may be mounted to the stepped portion 111.

Alternatively, four individual coils may be arranged at the outer circumferential surface of the bobbin 110 at an interval of 90 degrees. The coil unit 120 including the four coils may create an electromagnetic field upon receiving power applied from a printed circuit board (not illustrated) as described below and move the bobbin 110 via interaction with a magnet unit 230 as described below.

The stationary unit 200 may include a housing 220, a magnet unit 230, and a base 240 and may further include a cover member 210. The cover member may serve as a housing. The moving unit 100 may be moved via interaction between the magnet unit of the stationary unit 200 and the coil unit of the moving unit 100.

The housing 220 may be outwardly spaced apart from the bobbin 110 by a prescribed distance. In addition, the housing 220 may not be separately provided, but be integrally formed with the cover member 210 as described below. Alternatively, the external appearance of the lens moving apparatus may be defined by only a separate cover member.

In the present embodiment, the housing 220 may be supported by the base 240 and configured to receive the bobbin 110 therein. The housing 220 may take the form of a cuboid corresponding to a shape of the cover member 210 and have open top and bottom sides to support the moving unit 100.

The housing 220 may be provided at side surfaces thereof with magnet coupling apertures 221 or magnet coupling recesses having a shape corresponding to magnets as described below. The magnet coupling apertures 221 may be formed in the housing 220 so as to be equal in number to the magnets as described below. The magnet coupling apertures 221 or the magnet coupling recesses according to the embodiment may be formed in two opposite side surfaces of the housing 220 as illustrated in consideration of the sensing magnet 510 as described below, but may be formed in all of four side surfaces of the housing 220.

In addition, the housing 220 may be formed of an insulating material and may be an injection molded article in consideration of productivity.

The housing 220 may be provided at an upper surface thereof with at least two stoppers 222 spaced apart from each other by a prescribed distance. The stoppers 222 may protrude from the upper surface of the housing 220 to absorb external shock. The stoppers 222 may be integrally formed with the housing 220, may be formed at the bobbin 110, or may be omitted.

In addition, the housing 220 may be provided at the upper surface and/or a lower surface thereof with one or more second coupling bosses 223. The second coupling bosses 223 may be inserted into second coupling holes 310*aa* of an outer part 310*a* of the upper elastic member 310 or the lower elastic member 320 as described below. For example, four second coupling bosses 223 may be equidistantly formed at symmetrical or asymmetrical positions.

The housing 220 may have fixing bosses 224, which may protrude from the housing 220 so as to be located at both ends of a reduced-thickness portion 310*ab* for fixing of the reduced-thickness portion 310*ab* formed at the outer part 310*a* of the upper elastic member 310 as described below.

Referring to FIG. 37, the housing 220 may be provided at the upper surface thereof with one or more receiving recesses 225 in which damper members 400 as described below are charged by a prescribed height. For example, four receiving recesses 225 may be equidistantly arranged at symmetrical or asymmetrical positions. Here, the receiving recesses 225 may be formed in the center of each side of the housing 220 as illustrated, or may be formed at each corner of the housing 220.

In addition, the housing 220 may be provided at one side surface thereof with a position sensor hole 227 or a second recess (not shown) in which a position sensor 520 as described below is located. In consideration of an installation relationship between a substrate 530 and the position sensor 520, the position sensor 520 may be installed to the position sensor hole 227 formed in the side surface as illustrated. The position sensor may be a hall sensor.

In addition, the housing 220 may be formed at a lower end of each corner of the outer surface thereof with a coupling recess 226 in which a coupling protrusion 241 of the base 240 as described below may be seated. The coupling protrusion 241 and the coupling recess 226 may facilitate easy assembly of the housing 220 and the base 240 and achieve strong fixing force.

The housing 220 may be spaced apart from the cover member 210 by a given distance, or may be engaged with the cover member 210. The bobbin 110 may be moved in the optical axis direction via interaction of the coil unit 120 and a magnet unit 230.

The magnet unit 230 may be mounted to the housing 220 or the cover member 210 using, for example, an adhesive, so as to be opposite to the coil unit 120. The magnet unit 230 may include two or four magnets fitted into the magnet coupling apertures 221 formed in the housing 220, which ensure efficient utilization of the interior volume of the housing 220.

Alternatively, the two or four magnets of the magnet unit 230 may be attached to two or four inner side surfaces of the housing 220 so as to be opposite to the coil unit 120.

Although the magnets of the magnet unit 230 may have a rectangular parallelepiped shape as illustrated, the embodiment is not limited thereto and the magnets may have a polygonal column shape.

The base 240 may be configured to allow the housing 220 to be fixed to an upper surface thereof. Specifically, the base 240 may be coupled to the cover member 210 as described below so as to enclose the moving unit 100 and the housing 220.

A through-hole 242 is formed in the center of the base 240 and corresponds to the lens unit 10 as described below. In addition, the base 240 may have a center circular recess 243 to allow the bobbin 110 to be spaced apart from the base 240.

In addition, the base 240 may have one or more coupling protrusions 241 protruding from upper corners thereof so as to come into surface contact with or be inserted into the coupling recesses 226 of the housing 220. The coupling protrusions 241 may facilitate easy coupling of the housing 220 and the base 240 and achieve strong fixing after coupling.

The base 240 may be formed at one side surface thereof with a seating recess 244 in which a terminal unit 531 of the substrate 530 as described below is seated. The seating recess 244 may be indented in at least one side surface of the base 240. In addition, the seating recess 244 may be formed at a right angle or an acute angle relative to the inner surface of the cover member 210 as described below so as to correspond to the arrangement angle of the terminal unit 531.

The base 240 may function as a sensor holder to protect an image sensor (not illustrated) as described below, and a filter (not illustrated) may be installed to the base 240. In this case, the filter may be mounted near the center through-hole of the base 240 and may include an infrared filter or a blue filter.

Here, the filter may be formed of, for example, a film material or a glass material. For example, an infrared cutoff coating material may be disposed on an optical filter in the form of a flat plate such as, for example, a cover glass for protection of an imaging surface.

In the case where the filter is installed at the outer side of a lens, the filter may not be separately provided and the lens surface may be coated for infrared cutoff.

Meanwhile, the lens moving apparatus according to the embodiment may further include the elastic unit 300.

The elastic unit 300 may include an upper elastic member 310 and a lower elastic member 320 connected to the bobbin 110 and the housing 220 to provide the moving unit 100 with return force. Although each of the upper elastic member 310 and the lower elastic member 320 may consist of separate elastic members arranged at respective sides of the housing 220, each elastic member may take the form of a leaf spring formed by bending or cutting a single plate in terms of production efficiency.

The upper elastic member 310 is disposed on the upper ends of the bobbin 110 and the housing 220 to support the bobbin 110 and serves to provide the bobbin 110 with return force upon upward movement of the bobbin 110.

The upper elastic member 310 includes an outer part 310a fastened to the housing 220, an inner part 310b fastened to the bobbin 110, and connectors 310c connecting the inner part 310b and the outer part 310a to each other. Here, each connector 310c may be at least one bent portion.

For coupling of the upper elastic member 310, the housing 220 may be provided at the upper surface thereof with the second coupling bosses 223 and the outer part 310a may be formed with the second coupling holes 310aa corresponding to the second coupling bosses 223 for coupling of the second coupling bosses 223.

On the other hand, for coupling of the upper elastic member 310, the bobbin 110 may be provided at the upper surface thereof with the first coupling bosses 112 and the inner part 310b may be formed with first coupling holes 310ba corresponding to the first coupling bosses 112. Coupling between the coupling bosses and the coupling holes may be implemented via thermal fusion, adhesion or soldering.

In addition, the inner part 310b of the upper elastic member 310 may be formed with shock-absorbing portions 310bb, which extend to the outer part 310a and are received in the respective receiving recesses 225. Although the shock-absorbing portions 310bb may have a bent shape, the embodiment is not limited to this shape and the shock-absorbing portions 310bb may have any other shapes so long as they may extend from the inner part 310b so as to be received in the receiving recesses 225. A free end of each shock-absorbing portion 310bb may be spaced apart from the bottom surface of the receiving recess 225 by a prescribed distance. In this case, a portion of the free end may be elastically received in the damper member 400 as described below.

The outer part 310a may have the reduced-thickness portions 310ab to prevent interference with the shock-absorbing portions 310b extending from the inner part 310b. The reduced-thickness portions 310ab may be supported by the fixing bosses 224 of the housing 220 as described above.

The embodiment may include the position sensing unit 500. The position sensing unit 500 may basically include a sensing magnet 510, a position sensor 520, and a substrate 530. The position sensor may be a hall sensor. The substrate 530 may be implemented into a flexible printed circuit board located between the outer surface of the housing 220 and the cover member 210 and may include the terminal unit 531 for connection with an external power source.

In this case, the terminal unit 531 may extend downward, i.e. toward the base for soldering with a separate printed circuit board as described below.

In addition, the substrate 530 may be electrically connected to both distal ends of the coil unit 120 to apply power to the coil unit 120.

The position sensor 520 may be mounted to the substrate 530. Specifically, the position sensor 520 may be located at the housing 220 so as to be opposite to the sensing magnet 510 for sensing the strength and phase of a magnetic field of the sensing magnet 510 located at the bobbin 110 and may cause auto-focusing for rapid and precise control of the bobbin 110.

In consideration of a reduction in the size of the lens moving apparatus, although the position sensor 520 may be located in the position sensor hole 227 formed in the housing 220, the embodiment is not limited thereto and installation of the position sensor 520 may be implemented without a hole. In addition, the sensing magnet 510 may be located in the first recess 113 formed in the bobbin 110 and a portion of the substrate 530 where the terminal unit 531 is formed may be located in the seating recess 244 of the base 240.

The position sensor 520 may be located at the same line as the sensing magnet 510. In order to sense displacement along the Z-axis corresponding to the optical axis direction, the sensing magnet 510 may be mounted to the outer surface of the bobbin 110 separately from the magnet unit 230 for driving of the moving unit 100. As needed, the sensing magnet 510 may serve as the magnet unit.

On the other hand, differently from the illustration, the position sensor 520 may be provided at the bobbin 110 inside the coil unit 120. In this case, the position sensor 520 may be hidden by the coil unit 120 so as not to be seen from the outside. In addition, the position sensor 520 may be located at the outer side of the coil unit 120.

In addition, the sensing magnet or the position sensor may be located above or below the coil unit so as not to overlap with the coil unit. In this case, interference with the coil may be reduced. Although the position sensor 520 may be located closer to the coil unit 120 than the sensing magnet 510, in consideration of the fact that the strength of the magnetic field created at the sensing magnet 510 is hundreds of times of the strength of a magnetic field created at the coil, the electro-magnetic field of the coil unit 120 is not under consideration upon sensing of movement of the sensing magnet 510.

The cover member 210 may be coupled to the base 240 so as to receive the moving unit 100, the fixing unit 200 and the elastic unit 300 and may define the external appearance of the lens moving apparatus. As illustrated, although the cover member 210 may have a rectangular parallelepiped shape having an upper opening 211 and a lower opening, the shape of the cover member 210 is not limited thereto.

An inner side surface of the cover member 210 may come into close contact with a side portion of the base 240 such that the bottom of the cover member 210 is closed by the base 240. As such, the cover member 210 may function to protect internal constituent elements from external shock and to prevent infiltration of outside contaminants.

In addition, the cover member 210 may function to protect constituent elements of the camera module from interference of external radio waves generated by a cellular phone and the like. Accordingly, the cover member 210 may be formed of a metal material such as iron and aluminum and may be plated with a metal such as nickel for anti-corrosion.

Although not illustrated, a portion of one surface of the cover member 210 corresponding to the seating recess 244 of the base 240 may be exposed. The exposed portion may facilitate easy soldering of the terminal unit 531 and the printed circuit board as described below and prevent short-circuit of the cover member 210 due to solder balls. In addition, a downwardly bent inner yoke 212 may be formed at the inner circumference of the opening 211 formed in the upper surface of the cover member 210. The inner yoke may be located between the bobbin 110 and the coil unit 120.

Meanwhile, the embodiment may include the damper members 400 located between the housing 220 and the elastic unit 300 and/or between the bobbin 110 and the elastic unit 300. The damper members 400 may be formed of sol or gel type epoxy and may be applied between the housing 220 and the elastic unit 300 and/or between the bobbin 110 and the elastic unit 300 so as to absorb shock.

Specifically, the bobbin 110 is moved in the optical axis direction and this movement is for auto-focusing of an object. The inner part 310b of the upper elastic member 310 is elastically deformed simultaneously with movement of the bobbin 110 and provides return force after movement of the bobbin 110 in which the lens unit 10 is received. Here, in the embodiment, since the shock-absorbing portion 310bb extends from the inner part 310b and the free end of the shock-absorbing portions 310bb is spaced apart from the damper member 400 applied to the housing 220 of the fixing unit 200 by a prescribed distance, translation of the elastic member may be alleviated. In the embodiment, to efficiently apply the damper member 400, the housing 220 has the receiving recess 225, the damper member 400 is charged in the receiving recess 225 with a prescribed distance therebetween, and the shock absorbing portion 310bb coming into contact with the damper member 400 is spaced apart from the bottom surface of the receiving recess 225 by a prescribed distance.

Meanwhile, separately from or in combination with the above embodiment (between the housing 220 and the elastic unit 300), in another embodiment (between the bobbin 110 and the elastic unit 300), in order to be connected to the inner part 310b so as to alleviate translation of the connector 310c that is elastically formed simultaneously with movement of the bobbin 110, the protrusion 114 may be formed at the upper surface of the bobbin 110 of the moving unit 100 at a position in the proximity of the connector 310c and the damper member 400 may be applied between the connector portion 310c and the protrusion 114.

With the above-described structural feature for arrangement of the damper member 400, an experimental example as illustrated in FIG. 38 may be derived. FIG. 38(a) illustrates generation of a resonance point in a conventional lens moving apparatus and FIG. 38(b) illustrates a graph illustrating a frequency value upon movement of the lens moving apparatus according to the embodiment.

As illustrated in the graph of FIG. 38(b), the embodiment may remove peaks P1 and P2 of a resonance frequency according to the related art, i.e. resonance points P1 and P2 as illustrated in the graph of FIG. 38(a).

By adjusting the amount or application area of the damper member 400, the embodiment may increase a resonance frequency and, for example, a regulated resonance frequency may be within a range of 50 Hz to 180 Hz so as not to overlap with a resonance frequency range of a vibration motor.

For example, by proposing a structure for efficiently arranging the damper member 400 at the elastic member, the moving unit 100 and/or the fixing unit 200, the embodiment may increase durability and reliability of the damper member 400 by preventing separation of the damper member 400 and may achieve noise removal, improved control stability and oscillation removal with regard to driving of the lens moving apparatus by changing the shape of a frequency or a resonance point. It will be appreciated that the embodiment has been described with regard to an auto focusing type lens moving apparatus, the embodiment may be applied to an optical image stabilization (OIS) type lens moving apparatus.

Meanwhile, the lens moving apparatus according to the embodiment may be mounted to a camera module. The camera module may be applied to various multimedia products such as, for example, a cellular phone, a laptop computer, a camera phone, a PDA, and a smart toy and may also be applied to image input devices such as, for example, a monitoring camera or an information terminal of a video tape recorder. For example, in the case where the lens moving apparatus according to the embodiment is installed to the camera module, although the camera module is not illustrated, the lens unit 10, the printed circuit board, and the image sensor may be further provided.

The lens unit 10 may be a lens barrel without being limited thereto and may have any other shapes so long as it may support a lens. The embodiment will be described based on the case in which the lens unit 10 is a lens barrel.

The lens unit 10 is installed on the printed circuit board as described below at a position corresponding to the image sensor. The lens unit 10 includes one or more lenses.

In addition, the camera module according to the embodiment may further include the printed circuit board. The printed circuit board may be provided at the center of an upper surface thereof with the image sensor (not illustrated) and a variety of elements (not illustrated) for driving of the camera module.

In addition, to apply power required to drive the lens moving apparatus according to the embodiment, the printed circuit board may be connected to the terminal unit 531, the upper elastic member 310 or the lower elastic member 320, or may be electrically connected to the coil unit 120.

The image sensor (not illustrated) may be mounted at the center of the upper surface of the printed circuit board so as to be aligned with the lenses of the lens unit 10 along the optical axis direction. The image sensor converts optical signals with respect to an object received through the lenses into electric signals.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
   a housing;
   a bobbin disposed in the housing;
   a coil disposed on the bobbin;
   a magnet disposed on the housing to correspond to the coil;
   an upper elastic member coupled to an upper portion of the bobbin and an upper portion of the housing; and
   a damper coupled to the upper elastic member and the housing,
   wherein the upper elastic member comprises a connector connecting the bobbin and the housing and a protrusion extending toward the housing, and
   wherein the damper is coupled to the protrusion and the housing.

2. The lens moving apparatus according to claim 1, wherein the protrusion horizontally extends from an outer surface of the connector.

3. The lens moving apparatus according to claim 1, wherein the housing comprises a recess corresponding to a portion of the protrusion, and
   wherein a portion of the damper is disposed between the portion of the protrusion and the recess of the housing.

4. The lens moving apparatus according to claim 1, wherein the protrusion comprises a through hole, and
   wherein a portion of the damper is disposed between the through hole of the protrusion and the housing.

5. The lens moving apparatus according to claim 3, wherein the recess is recessed from an upper surface of the housing and disposed under the portion of the protrusion.

6. The lens moving apparatus according to claim 3, wherein a through hole is formed at the portion of the protrusion, and
   wherein the portion of the damper is disposed between the through hole and the recess of the housing.

7. The lens moving apparatus according to claim 6, wherein the through hole is overlapped with the recess of the housing in a first direction in parallel to an optical axis.

8. The lens moving apparatus according to claim 1, wherein the damper is overlapped with the protrusion in a first direction in parallel to an optical axis, and not overlapped with the connector.

9. The lens moving apparatus according to claim 1, wherein the upper elastic member comprises an inner frame coupled to the upper portion of the bobbin and an outer frame coupled to the upper portion of the housing, and
   wherein the connector connects the inner frame and the outer frame.

10. The lens moving apparatus according to claim 9, wherein the damper is spaced apart from the inner frame and the outer frame.

11. The lens moving apparatus according to claim 9, wherein the protrusion comprises:
    a first end portion coupled to the connector; and
    second end portion disposed in opposite to the first end portion, and
    wherein a portion of the damper is disposed between the second end portion and the housing.

12. The lens moving apparatus according to claim 11, wherein the second end portion is disposed closer to the outer frame than the inner frame.

13. The lens moving apparatus according to claim 11, wherein a length of the protrusion is short than a length of the connector, and
    wherein the length of the protrusion is a length from the first end portion to the second end portion, and the length of the connector is a length from one end of the connector coupled to the inner frame to another end of the connector coupled to the outer frame.

14. The lens moving apparatus according to claim 1, further comprising a lower elastic member coupled to a lower portion of the bobbin and a lower portion of the housing.

15. The lens moving apparatus according to claim 1, further comprising:
    a position sensor disposed on the housing; and
    a sensing magnet disposed on the bobbin and corresponding to the position sensor.

16. The lens moving apparatus according to claim 15, further comprising a circuit board disposed on the housing, and electrically connected to the position sensor.

17. The lens moving apparatus according to claim 1, wherein the connector comprises four connectors spaced apart from each other, and
    wherein the protrusion comprises four protrusions corresponding to the four connectors,
    wherein the damper comprises four dampers corresponding to the four protrusions, and
    wherein each of four dampers is coupled to corresponding one of the four protrusions.

18. A camera module comprising:
    a housing;
    a bobbin disposed in the housing;
    a lens coupled to the bobbin;

a coil disposed on the bobbin;

a magnet disposed on the housing to correspond to the coil;

an upper elastic member coupled to an upper portion of the bobbin and an upper portion of the housing;

a damper coupled to the upper elastic member and the housing, a printed circuit board disposed below the lens; and an image sensor disposed on the circuit board, wherein the upper elastic member comprises a connector connecting the bobbin and the housing and a protrusion extending toward the housing, and wherein the damper is coupled to the protrusion and the housing.

19. A phone comprising:

the camera module according to claim 18; and a controller adjusting an amount of current applied to the coil.

* * * * *